United States Patent
Van Druten et al.

(10) Patent No.: US 10,550,920 B2
(45) Date of Patent: Feb. 4, 2020

(54) TRANSMISSION SYSTEM, AS WELL AS METHOD FOR CHANGING A TRANSMISSION RATIO

(75) Inventors: Roëll Marie Van Druten, Eindhoven (NL); Alexander Franciscus Anita Serrarens, Waalre (NL); Bas Gerard Vroemen, Eindhoven (NL)

(73) Assignee: DTI Group B.V., Eindhoven (NL)

(*) Notice: Subject to any disclaimer, the term of this patent is extended or adjusted under 35 U.S.C. 154(b) by 144 days.

(21) Appl. No.: 13/980,315

(22) PCT Filed: Dec. 20, 2011

(86) PCT No.: PCT/NL2011/050862
§ 371 (c)(1),
(2), (4) Date: Oct. 24, 2013

(87) PCT Pub. No.: WO2012/112028
PCT Pub. Date: Aug. 23, 2012

(65) Prior Publication Data
US 2014/0033843 A1    Feb. 6, 2014

(30) Foreign Application Priority Data

Dec. 17, 2010   (NL) .................................... 2005881
Oct. 18, 2011   (NL) .................................... 2007613
(Continued)

(51) Int. Cl.
*F16H 3/00*   (2006.01)
*F16H 37/04*  (2006.01)

(52) U.S. Cl.
CPC ....... *F16H 37/04* (2013.01); *F16H 2003/008* (2013.01); *Y10T 74/19219* (2015.01)

(58) Field of Classification Search
CPC ............. F16H 3/006; F16H 2003/0933; F16H 2003/007; F16H 2003/008
(Continued)

(56) References Cited

U.S. PATENT DOCUMENTS

| 3,673,890 A | 7/1972 | Crooks et al. |
| 3,675,508 A * | 7/1972 | Blank ................ B60K 17/3505 74/357 |

(Continued)

FOREIGN PATENT DOCUMENTS

| CN | 1802272 A | 7/2006 |
| CN | 101061013 A | 10/2007 |

(Continued)

*Primary Examiner* — Ha Dinh Ho
*Assistant Examiner* — Bobby Rushing, Jr.
(74) *Attorney, Agent, or Firm* — Banner & Witcoff, Ltd.

(57) ABSTRACT

A transmission system for a vehicle, comprising an input shaft which can be connected to a drive source, and an output shaft which can be connected to a load comprises:—a clutch module which has an input that is connected to the input shaft and a first and a second output, as well as first clutch means which are located between the input and the first output and second clutch means which are located between the input and the second output, and gear stage means which are located between the input and the first or second output, as well as—a transmission module which has a first and a second input and an output that is connected to the output shaft, as well as a first sub-transmission which is located between the first input and the output, and a second sub-transmission which is located between the second input and the output,—where the first output of the clutch module is connected to a first input of the transmission module and the second input of the clutch module is connected to the second input of the transmission module, and—where the first and second sub-transmissions each comprise an input shaft and an output shaft which are connected to the inputs (Continued)

and output of the transmission module and each comprise at least one gear stage which gear stages are located between the input and output shafts.

7 Claims, 27 Drawing Sheets

(30) Foreign Application Priority Data

Oct. 20, 2011 (NL) ...................................... 2007625
Dec. 9, 2011 (NL) ...................................... 2007939

(58) Field of Classification Search
USPC .................................. 74/325, 330, 340, 356
See application file for complete search history.

(56) References Cited

U.S. PATENT DOCUMENTS

| | | | | |
|---|---|---|---|---|
| 3,897,699 | A * | 8/1975 | Hoyer | F16H 3/093 74/15.4 |
| 4,693,129 | A * | 9/1987 | Pierce | F16H 3/006 74/333 |
| 6,588,292 | B2 * | 7/2003 | Yamasaki | F16H 3/006 74/339 |
| 6,793,604 | B2 * | 9/2004 | Kobayashi | F16H 3/089 475/220 |
| 7,267,022 | B2 * | 9/2007 | Gumpoltsberger | F16H 3/006 384/461 |
| 7,377,191 | B2 * | 5/2008 | Gitt | F16H 3/006 74/330 |
| 7,841,252 | B2 * | 11/2010 | Remmler | F16H 3/006 74/330 |
| 7,896,770 | B2 * | 3/2011 | Earhart | F16H 37/0833 475/209 |
| 7,958,798 | B2 * | 6/2011 | Hasegawa | F16H 3/006 74/325 |
| 8,323,142 | B2 * | 12/2012 | Masumoto | F16H 3/006 475/218 |
| 8,499,656 | B2 * | 8/2013 | Ross | F16H 3/006 74/330 |
| 9,003,906 | B2 * | 4/2015 | Phillips | F16H 3/006 74/330 |
| 2003/0148847 | A1 | 8/2003 | Kawamoto et al. | |
| 2004/0089087 | A1 * | 5/2004 | Krieg | F16H 3/091 74/329 |
| 2005/0211007 | A1 * | 9/2005 | Suzuki | F16H 3/006 74/340 |
| 2007/0022835 | A1 * | 2/2007 | Kilian | B60K 6/40 74/340 |
| 2007/0219038 | A1 | 9/2007 | Druten et al. | |
| 2008/0064550 | A1 | 3/2008 | Holmes | |
| 2008/0070742 | A1 | 3/2008 | Phillips | |
| 2008/0090691 | A1 | 4/2008 | Van Druten et al. | |
| 2008/0182700 | A1 | 7/2008 | Earhart | |
| 2009/0156349 | A1 | 6/2009 | Yang | |
| 2009/0272211 | A1 * | 11/2009 | Hoffmann | F16H 37/042 74/325 |
| 2010/0069198 | A1 * | 3/2010 | Takeshima | F16H 3/093 477/80 |
| 2010/0319486 | A1 * | 12/2010 | Kawamoto | F16H 57/0423 74/665 L |
| 2011/0067512 | A1 * | 3/2011 | Kang | F16H 3/006 74/330 |

FOREIGN PATENT DOCUMENTS

| | | | | |
|---|---|---|---|---|
| CN | 101144520 A | 3/2008 | | |
| CN | 101149093 A | 3/2008 | | |
| CN | 101189449 A | 5/2008 | | |
| CN | 101230899 A | 7/2008 | | |
| CN | 101779060 A | 7/2010 | | |
| CN | 103109106 B | 5/2016 | | |
| DE | 102008030516 | 6/2009 | | |
| DE | 102010030573 A1 * | 12/2011 | | B60K 6/442 |
| DE | 102011076390 A1 * | 11/2012 | | F16H 3/006 |
| EP | 1209017 | 5/2002 | | |
| EP | 1625037 B1 | 1/2008 | | |
| SU | 1273291 A1 | 11/1986 | | |
| WO | WO 2004103755 | 12/2004 | | |
| WO | WO2004103755 A1 | 12/2004 | | |
| WO | 2006/107202 A1 | 10/2006 | | |
| WO | WO 2006107202 | 10/2006 | | |
| WO | 2008151443 A1 | 12/2008 | | |
| WO | WO 2008151443 | 12/2008 | | |
| WO | WO2008151443 A1 | 12/2008 | | |
| WO | 2011133033 A1 | 10/2011 | | |
| WO | WO 2011133032 | 10/2011 | | |

\* cited by examiner

TRANSMISSION SYSTEM, AS WELL AS METHOD FOR CHANGING A TRANSMISSION RATIO

CROSS-REFERENCE TO RELATED APPLICATIONS

This application is a U.S. National Stage application under 35 U.S.C. § 371 of International Application PCT/NL2011/050862 (published as WO 2012/112028), filed 20 Dec. 2011. This application also claims the benefit of Netherlands application NL2007939, filed 9 Dec. 2011, and Netherlands application NL2007625, filed 20 Oct. 2011, and Netherlands application NL2007613, filed 18 Oct. 2011, and Netherlands application NL 2005881, filed 17 Dec. 2010.

FIELD OF THE INVENTION

The invention relates to a transmission system for a vehicle, comprising an input shaft which can be connected to a drive source, and an output shaft which can be connected to a load.

STATE OF THE ART

EP-A-1 625 037 has disclosed a transmission system with which, when applied to a vehicle, gear stage changes can be executed without the need for interrupting the torque transfer from the drive source to the wheels. The module forming part of this known transmission system is pre-eminently suitable for use in existing transmissions.

SUMMARY OF THE INVENTION

It is an object of the invention to provide a transmission system of the type defined in the opening paragraph which is more cost-effective than the known transmission system and with which, even without interruption of the torque transfer from the drive source to the wheels, it is possible to switch between two or more gear stages. For this purpose, the transmission system according to the invention is characterized in that the transmission system comprises a clutch module which has an input that is connected to the input shaft and a first and a second output, as well as first clutch means which are located between the input and the first output and second clutch means which are located between the input and the second output, and gear stage means which are located between the input and the first or second output, as well as a transmission module having a first and a second input and an output that is connected to the output shaft, as well as a first sub-transmission which is located between the first input and the output and a second sub-transmission which is located between the second input and the output, where the first output of the clutch module is connected to a first input of the transmission module and the second output of the clutch module is connected to the second input of the transmission module, and where the first and second sub-transmissions each comprising an input shaft and an output shaft which are connected to the inputs and output of the transmission module and each comprise at least one gear stage, which gear stages are located between the input and output shafts. The transmission system according to the invention can be used in a vehicle in lieu of a transmission and a clutch and is simpler and more cost-effective than the known transmission system in that the transmission module needs to have fewer gear stages for still realizing as many different gear ratios.

Preferably, at least one of the sub-transmissions comprises at least one transmission clutch which is located between the input shaft and the output shaft of this sub-transmission.

An embodiment of the transmission system according to the invention is characterized in that the first clutch means are formed by a brake and the gear stage means are located between the input and the first output and are formed by a planetary gear set comprising at least three rotational members of which a first rotational member is connected to the input, a second rotational member is connected to the first output and the third rotational member is connected to the brake.

A further embodiment of the transmission system according to the invention is characterized in that the first clutch means are formed by a first clutch and the gear stage means are located between the input and the first output and are formed by a main gear stage.

A still further embodiment of the transmission system according to the invention is characterized in that the transmission system comprises an intermediate clutch which is located between the two inputs of the transmission module or between the two outputs of the clutch module.

The largest gear ratio of the transmission system is preferably obtained by having the drive transmitted via the first clutch means, the intermediate clutch and the second sub-transmission, in which the second sub-transmission has the larger gear ratio of the two sub-transmissions. The gear ratio is the input revolutions per minute (RPM) divided by the output RPM.

Furthermore, preferably the smallest gear ratio of the transmission system is achieved by having the drive transmitted via the second clutch means, the intermediate clutch and the first sub-transmission, in which the first sub-transmission has the smaller gear ratio of the two sub-transmissions.

Again a further embodiment of the transmission system according to the invention is characterized in that the transmission system comprises an intermediate gear stage which is located between the two inputs of the transmission module or between the two outputs of the clutch module and is connected to the intermediate clutch.

The two inputs and the output of the transmission module are preferably concentric.

A further embodiment of the transmission system according to the invention is characterized in that between the second input and the output of the transmission module a direct clutch is present to connect the second input directly to the output.

Yet a further embodiment of the transmission system according to the invention is characterized in that the first sub-transmission comprises a continuously variable transmission.

The invention likewise relates to a method for changing a first gear ratio to a next, second gear ratio without an interruption of torque transfer from the input to the output of the transmission system according to the invention. With respect to the method the invention is characterized in that one of the clutch means is energized and the other clutch means are energized less whereas the transmission clutches are not changed.

An embodiment of the method according to the invention is characterized in that first the gear ratio is changed to a third gear ratio after which the gear ratio is changed to the second gear ratio.

BRIEF DESCRIPTION OF THE DRAWINGS

The invention will be described below in more detail based on examples of embodiment of the transmission system according to the invention represented in the drawing figures.

DETAILED DESCRIPTION OF THE DRAWINGS

Figure 1:
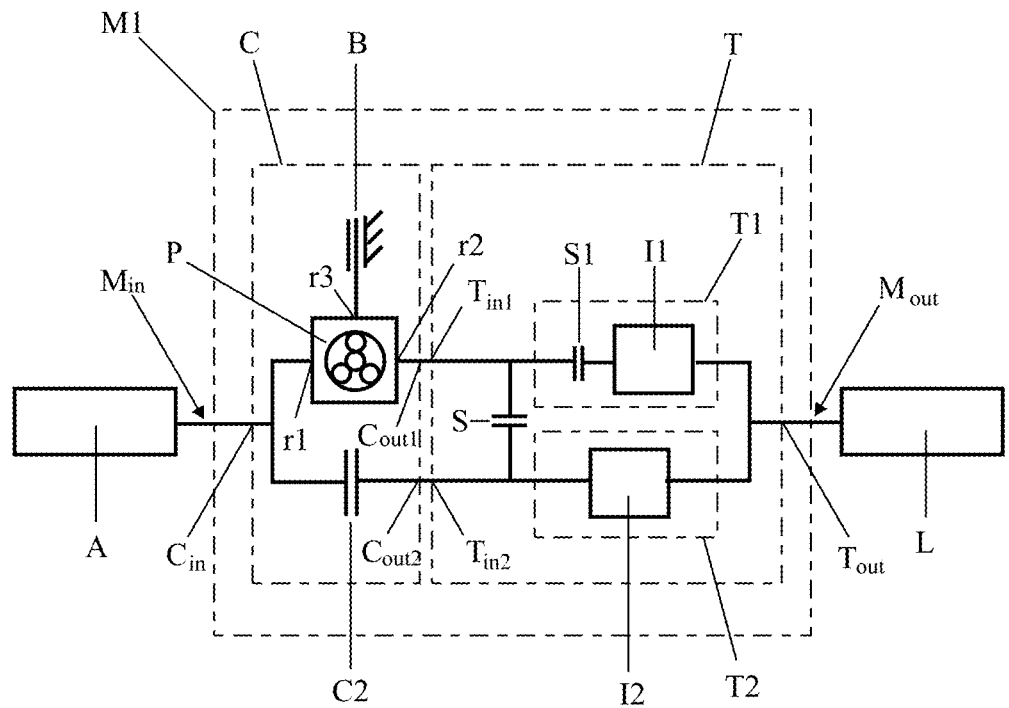

FIG. 1 gives a diagrammatic representation of a first embodiment of the transmission system according to the invention. The transmission system M1 comprises an input shaft $M_{In}$ which can be connected to a drive source A, and an output shaft $M_{out}$ which can be connected to a load L. The transmission system M1 further includes a clutch module C which has an input $C_{in}$ that is connected to the input shaft Min and a first and a second output $C_{out1}$ and $C_{out2}$. The clutch module comprises gear stage means which are formed by a planetary gear set P, and first clutch means which are formed by a brake B that is connected to one of the rotational members of the planetary gear set, and second clutch means which are formed by a clutch C2. The planetary gear set and the brake are located between the input $C_{in}$ and the first output $C_{out1}$ and the clutch C2 is located between the input $C_{in}$ and the second output $C_{out2}$. The transmission system M1 further includes a transmission module T which has a first and a second input $T_{in1}$ and $T_{in2}$ and an output $T_{out}$ which is connected to the output shaft $M_{out}$. This transmission module T comprises a first sub-transmission T1 which is located between the first input $T_{in1}$ and the output $T_{out}$, and a second sub-transmission T2 which is located between the second input $T_{in2}$ and the output $T_{out2}$. The first output of the clutch module C is connected to the first input of the transmission module T and the second output of the clutch module is connected to the second input of the transmission module. The first and second sub-transmissions T1 and T2 each have an input shaft and an output shaft which are connected to the inputs and output of the transmission module and each have a gear stage I1 and I2 respectively, which are located between the input and output shafts. The first sub-transmission T1 further includes a transmission clutch S1 which is located between the input shaft and the output shaft of this sub-transmission. The transmission module T further has an intermediate clutch S which is located between the two inputs $T_{in1}$ and $T_{in2}$ of the transmission module.

Figure 2:
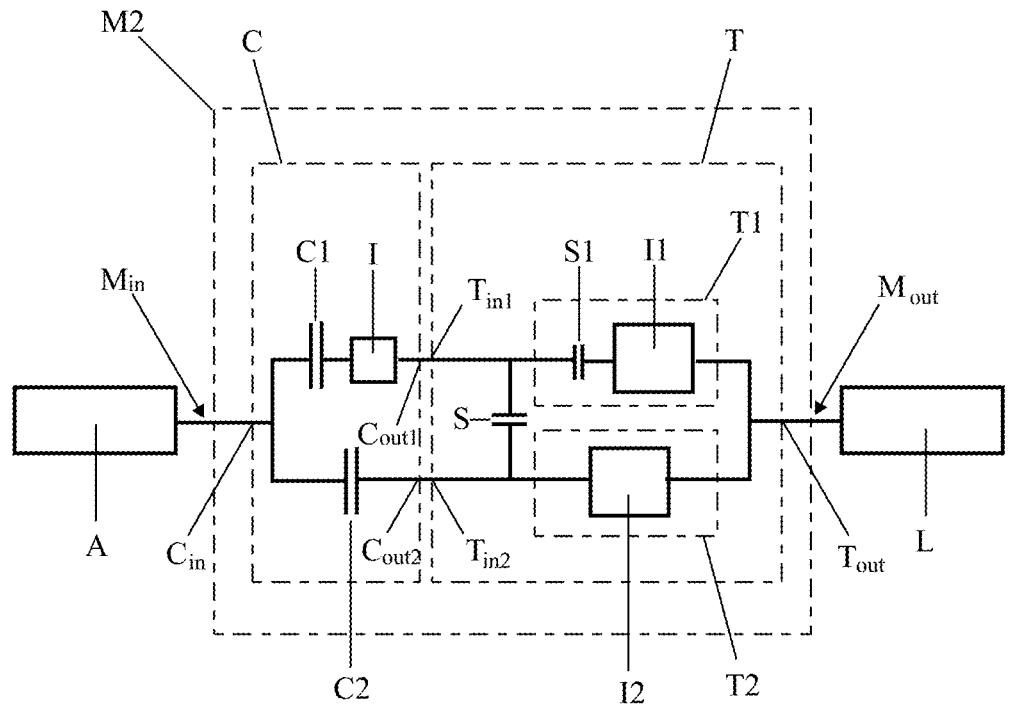

FIG. 2 gives a diagrammatic representation of a second embodiment of the transmission system according to the invention. In this transmission system M2 the first clutch means are formed by a further clutch C1 and the gear stage means are formed by a gear stage I. These gear stage means I are located within the clutch module between the clutch C1 and the first output of the clutch module.

Figure 3:
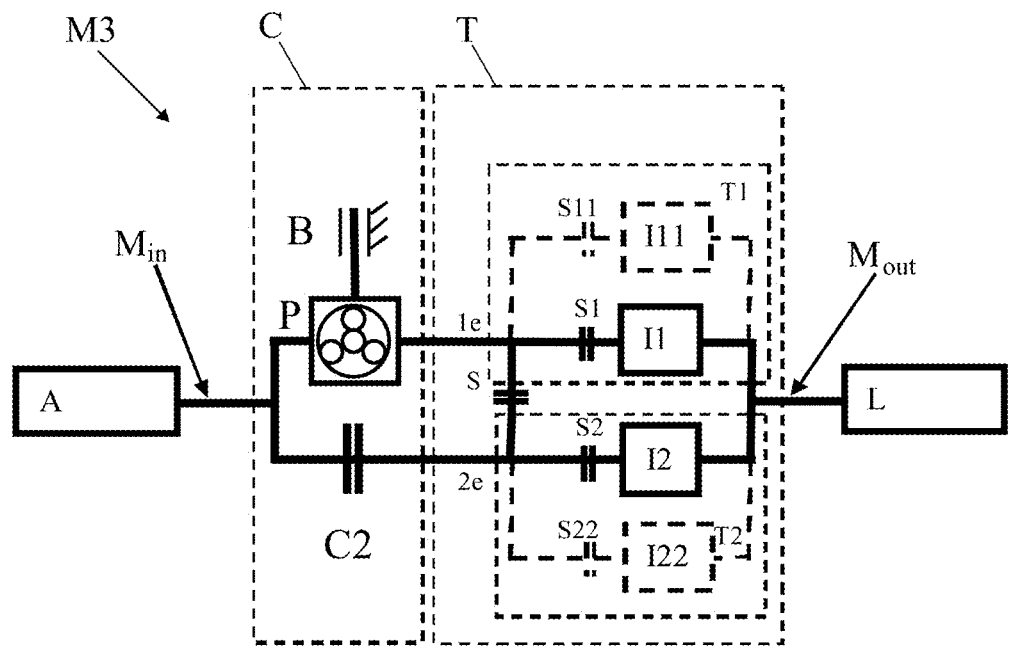
Figure 4:
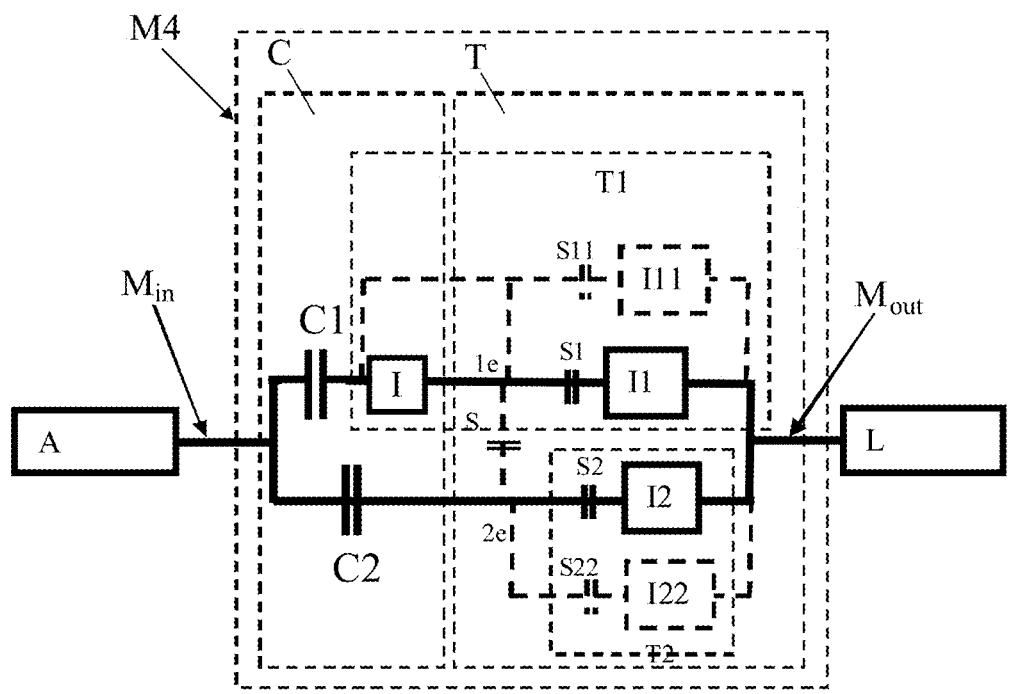

FIGS. 3 and 4 show the transmission systems M3 and M4 having two gear stages I1, I11 and I2, I22 and two transmission clutches S1, S11 and S2, S22 in each sub-transmission T1 and T2.

The lowest transmission gear ratio of the aggregate transmission system ($1^{st}$ gear) is obtained by means of the first clutch means C1/B, the gear stage means I or P of the clutch module and the second sub-transmission T2, while the intermediate clutch S is closed.

The gear ratio of the gear stage means I or P of the clutch module is selected such that the lowest forward gear of the transmission system ($1^{st}$ gear) can be achieved by closing the clutch C1 or the brake B.

The lowest transmission gear ratio from I1 to Ix (most retarding transmission gear ratio) is present within T2.

The highest transmission ratio of the aggregate transmission system is obtained by means of the second clutch means C2 and the first sub-transmission T1, where the intermediate clutch S is closed.

The highest transmission ratio of the aggregate transmission system is obtained by means of the second clutch means C2 and the second sub-transmission T2, where the intermediate clutch S is closed or open.

The $2^{nd}$ gear of the aggregate transmission system is obtained by means of the second clutch means C2 and the second sub-transmission T2, where the intermediate clutch S is closed or open.

Switching from the $1^{st}$ to the $2^{nd}$ gear of the transmission system is effected (while retaining torque on the output) by energizing/closing the second clutch means C2 and energizing less/opening the first clutch means C1 or B. The further transmission clutches need not be operated then.

Figure 5:
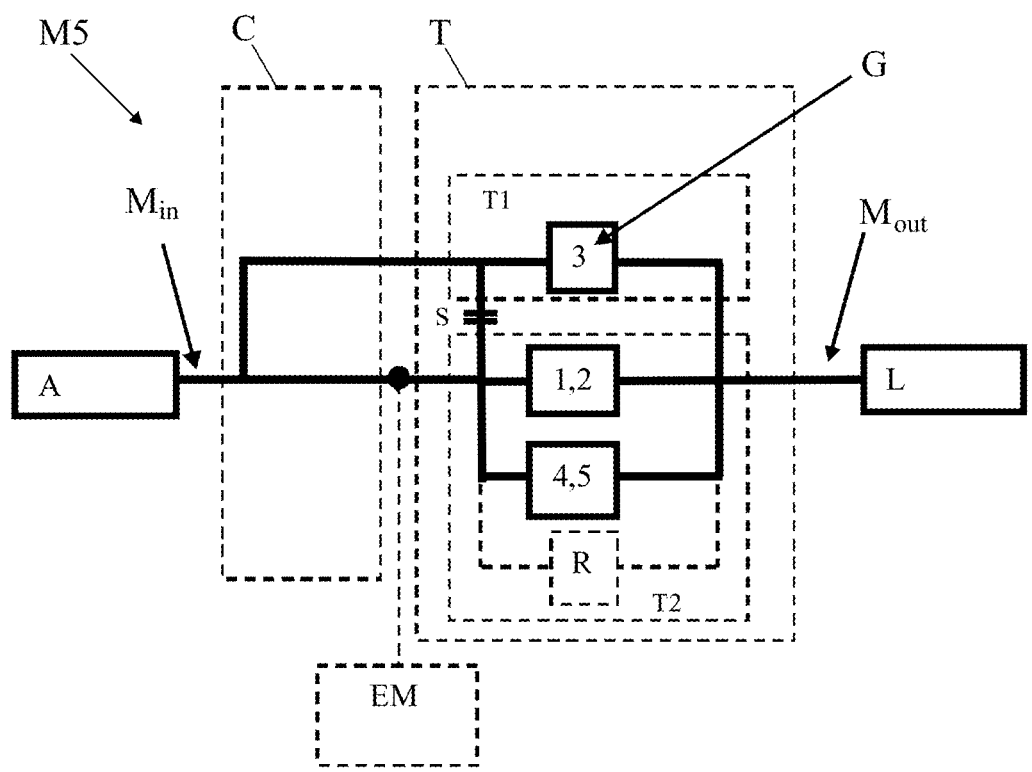

FIG. 5 shows a first functional variant of the transmission system in which the gears G are indicated (further details are omitted). The gears 1, 2 and 4, 5 can also be turned round with the same functionality within T2. The reverse gear R may be located both within T1 and T2 and in between T1 and T2.

Figure 6:
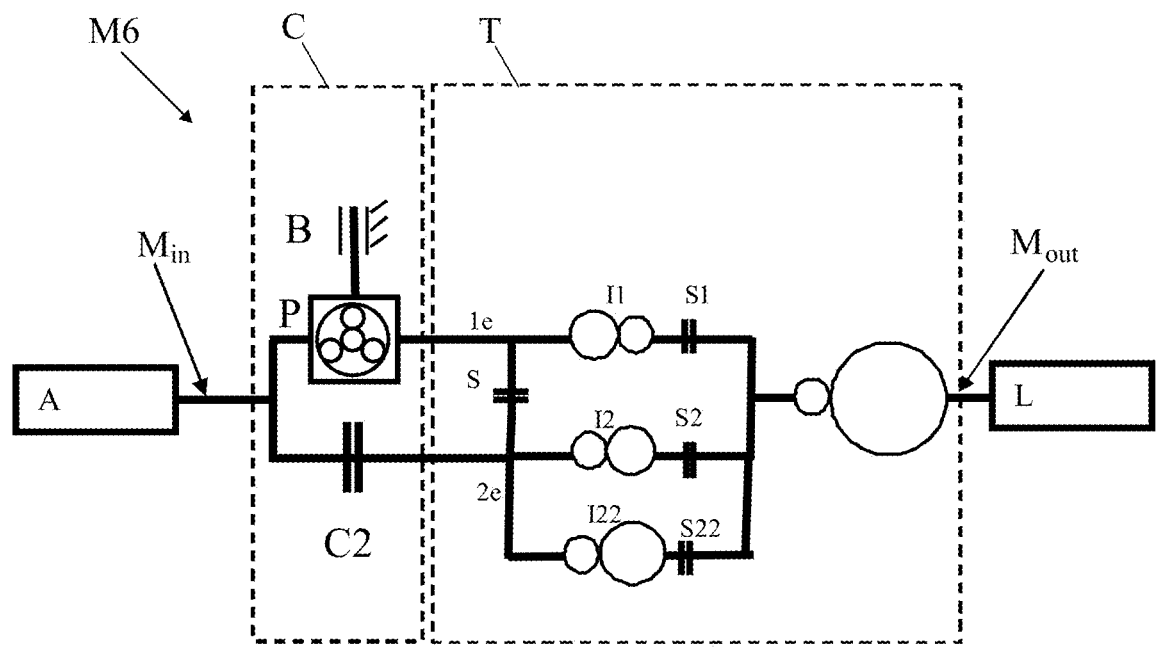
Figure 7:
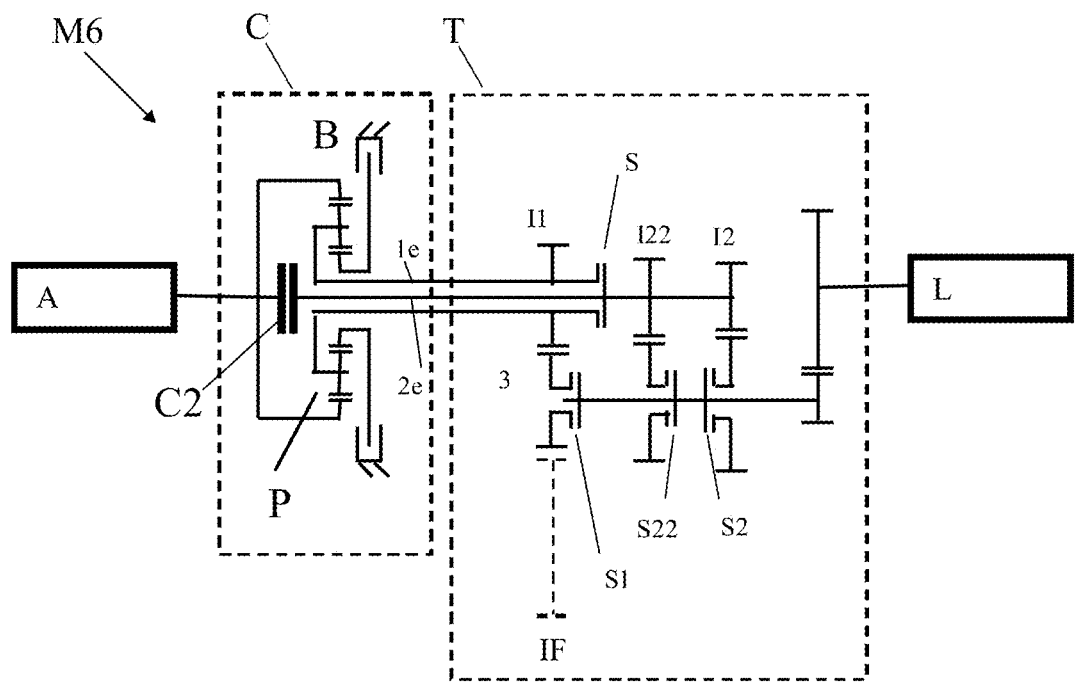

FIGS. 6 and 7 show a first embodiment of the first variant shown in FIG. 5, comprising bypass transmission P and brake B and one lay shaft. Clutches S and S1 can be operated with one switching fork and clutches S2 and S22 can be operated with one switching fork.

Figure 8:
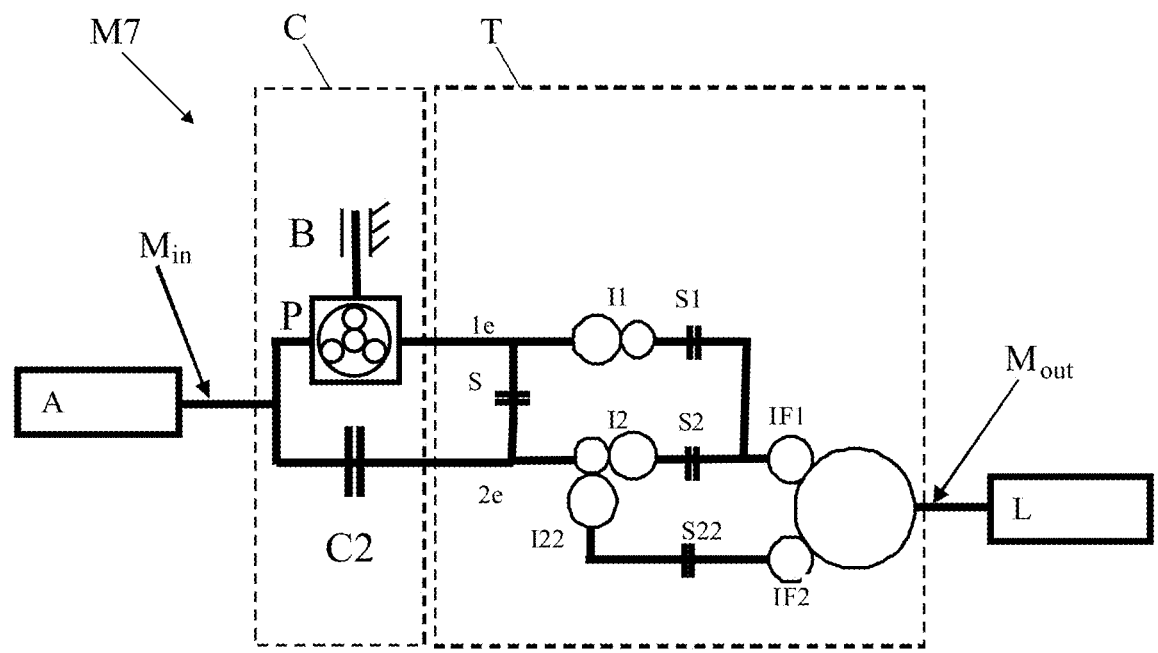
Figure 9:
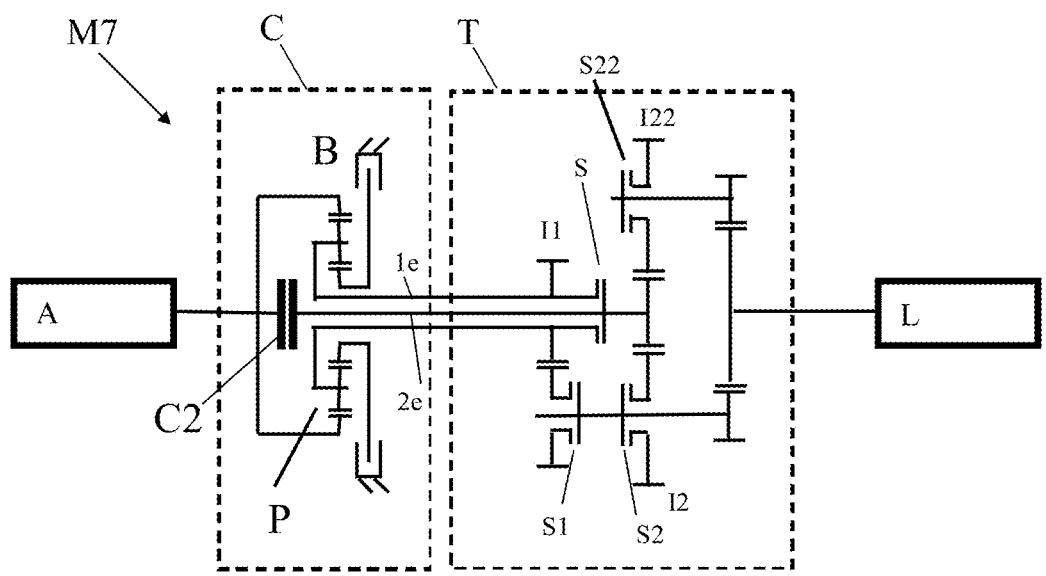

FIGS. 8 and 9 show a second embodiment comprising bypass transmission P and brake B as well as two lay shafts. Clutches S and S1 can be operated by one switching fork and also clutches S2 and S22 can be operated by one switching fork.

Figure 10:
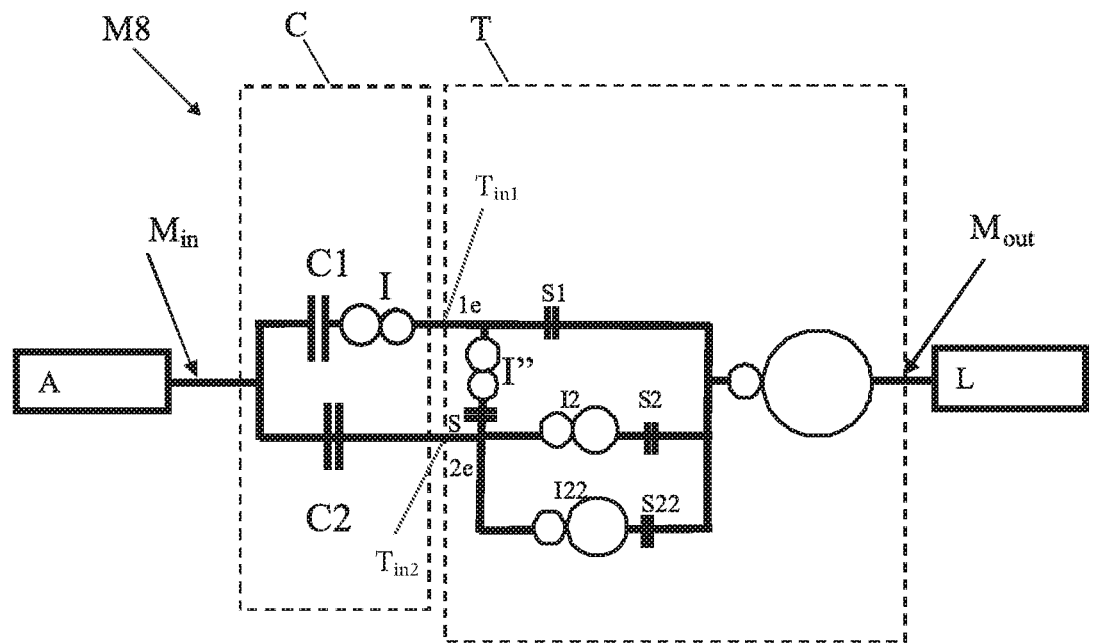
Figure 11:
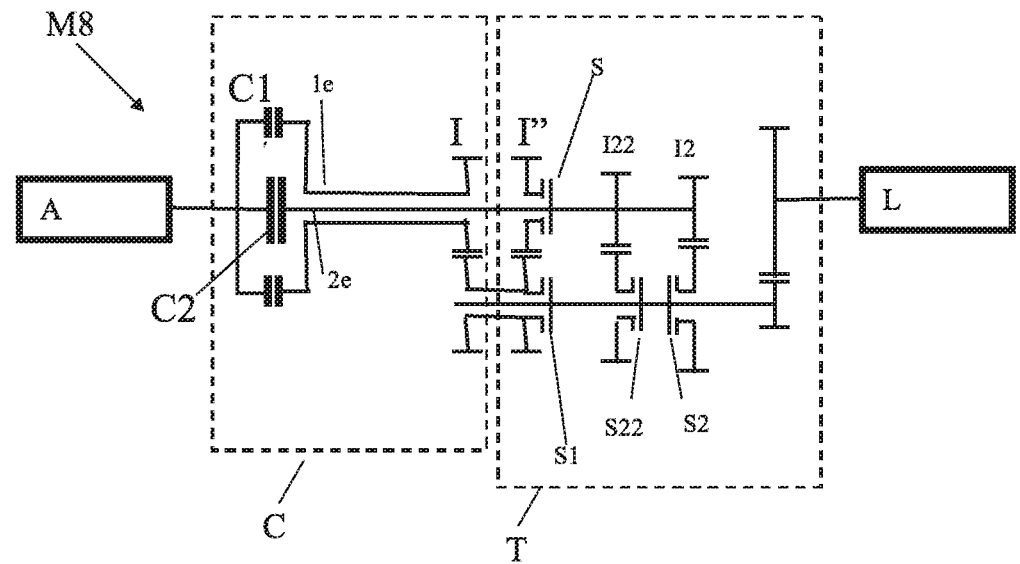

FIGS. 10 and 11 show a third embodiment comprising gear stage I and clutch C1 and one lay shaft. Clutches S and S1 can be operated by one switching fork and also clutches S2 and S22 can be operated by one switching fork. Intermediate clutch S of transmission module T is located between the two inputs $T_{in1}$ and $T_{in2}$ of transmission module T.

Figure 12:
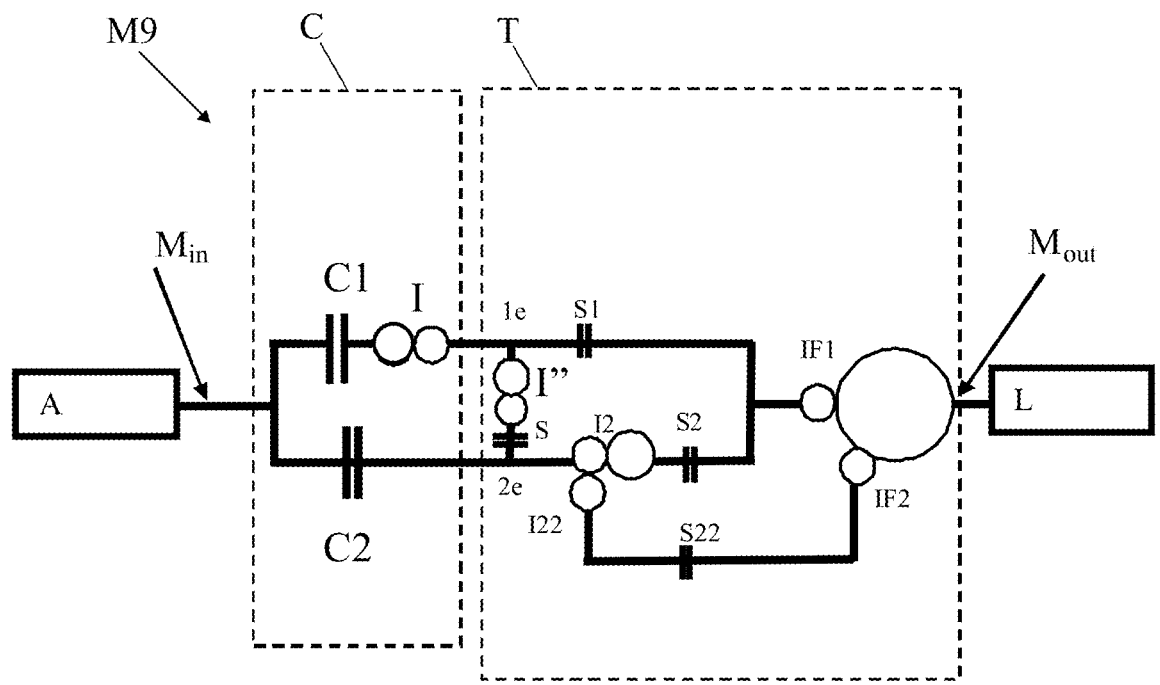
Figure 13:
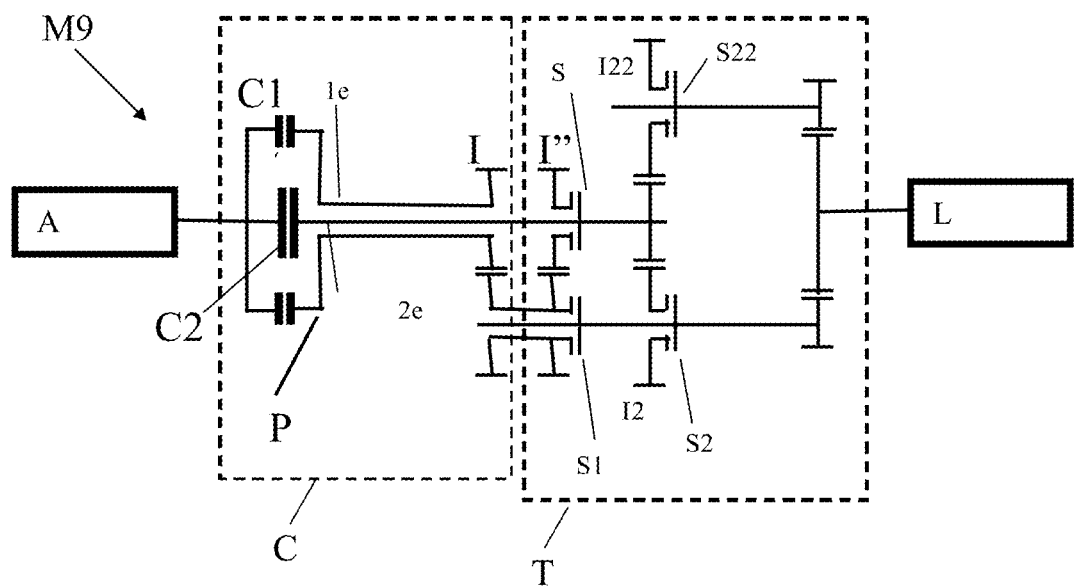

FIGS. 12 and 13 show a fourth embodiment comprising gear stage I and clutch C1 and two lay shafts. Clutches S and S1 can be operated by one switching fork and also clutches S2 and S22 can be operated by one switching fork.

The $3^{rd}$ gear of the aggregate transmission system is obtained by means of the first clutch means C1 or B, the gear stage element I or P of the clutch module and the first sub-transmission T1, in which the further clutch S is open.

Switching from the $2^{nd}$ to the $3^{rd}$ gear of the aggregate transmission system is effected (while retaining torque on the output) by energizing/closing the first clutch means C1 or B and energizing less/opening the second clutch means C2. There is no need for the further clutches to be operated then.

The $4^{th}$ gear of the aggregate transmission system is obtained by means of the first clutch means C1 or B, the gear stage element I or P of the clutch module and the second sub-transmission T2, in which the further clutch S is closed.

The $5^{th}$ gear of the aggregate transmission system is obtained by means of the second clutch means C2 and the second sub-transmission T2, in which the further clutch S is closed or open.

Switching from the $3^{rd}$ to the $4^{th}$ gear of the transmission system is effected (while retaining torque on the output) by energizing the second clutch means C2 and energizing the first clutch means C1 or B less. If the first clutch means C1 or B transfer substantially no torque, they are opened. Subsequently, the further clutch S is closed and the second clutch means C2 are energized further until the first clutch means C1 or B can be closed substantially in synchronism and the second clutch means C2 can be opened. During this switching action the further transmission clutches are operated indeed. The torque gain during this switching action takes place via the $5^{th}$ gear which is lower than the $4^{th}$ gear.

Switching from the $4^{th}$ to the $5^{th}$ gear of the transmission system is effected (while retaining torque on the output) by energizing/closing the second clutch means C2 and energizing less/opening the first clutch means C1 or B. There is no need for the further transmission clutches to be operated then.

One or more switching operations take place in the transmission system in which the switching from the $x^{th}$ to the $(x+1)^{th}$ gear of the transmission system is effected via the $(x+2)^{th}$, $(x+3)^{th}$ or $(x+4)^{th}$ gear.

The clutches S and S1 are operated by means of one switching fork and the clutches S2 and S22 are operated by means of a further switching fork.

In the transmission system shown in FIGS. 10 and 11 the transmission module is arranged to have one lay shaft, in which the output of T1 and the output of T2 are coupled to the output of the transmission module by means of one final reduction IF.

In the transmission systems shown in FIGS. 8 and 9, and 12 and 13 the transmission module is arranged to have at least two lay shafts, in which the output of T1 is coupled to the output of the transmission module by means of one final reduction IF1 and in which the output of T2 is coupled to the output of the transmission module by means of two final reductions (IF1 and IF2).

In the transmission system shown hereinafter in FIGS. 38 and 39 the transmission module is arranged to have at least two lay shafts, in which the output of T2 is coupled to the output of the transmission module by means of one final reduction IF2 and in which the output of T1 is coupled to the output of the transmission module by means of two final reductions (IF1 and IF2).

In the transmission system shown hereinafter in FIGS. 40 and 41 the transmission module is arranged to have at least two lay shafts, in which the output of T1 is coupled to the output of the transmission module by means of two final reductions (IF1 and IF2) and in which the output of T2 is coupled to the output of the transmission module by means of two final reductions (IF1 and IF2).

Figure 35:
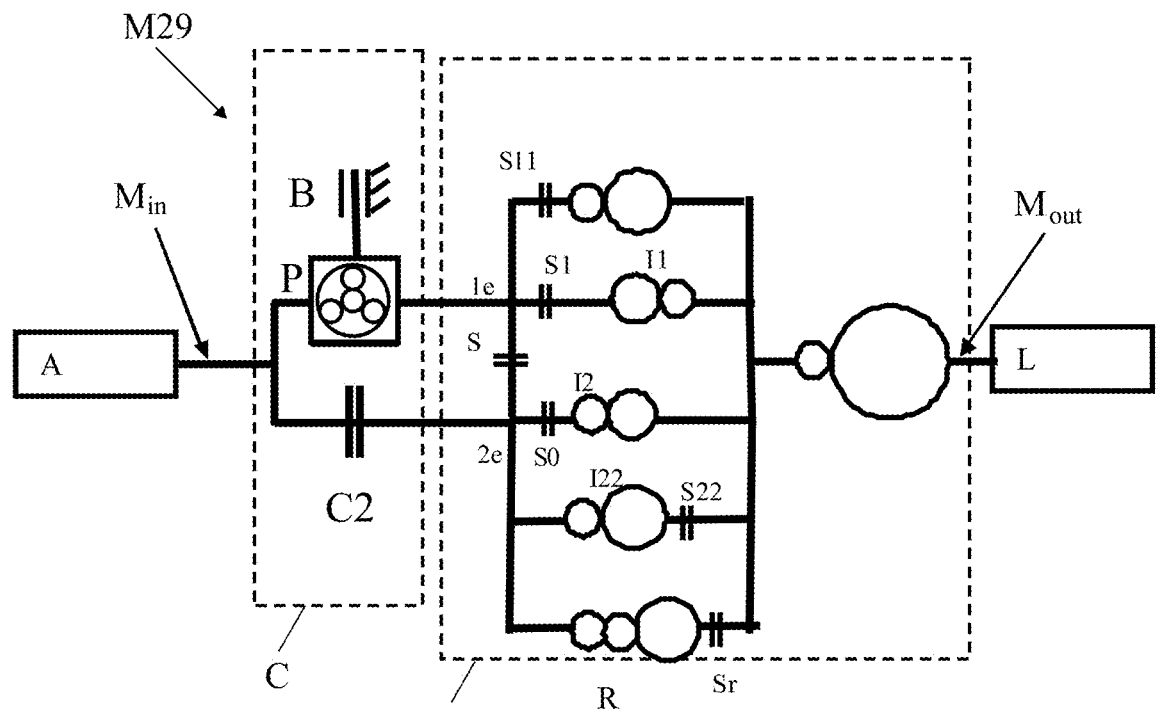
Figure 36:
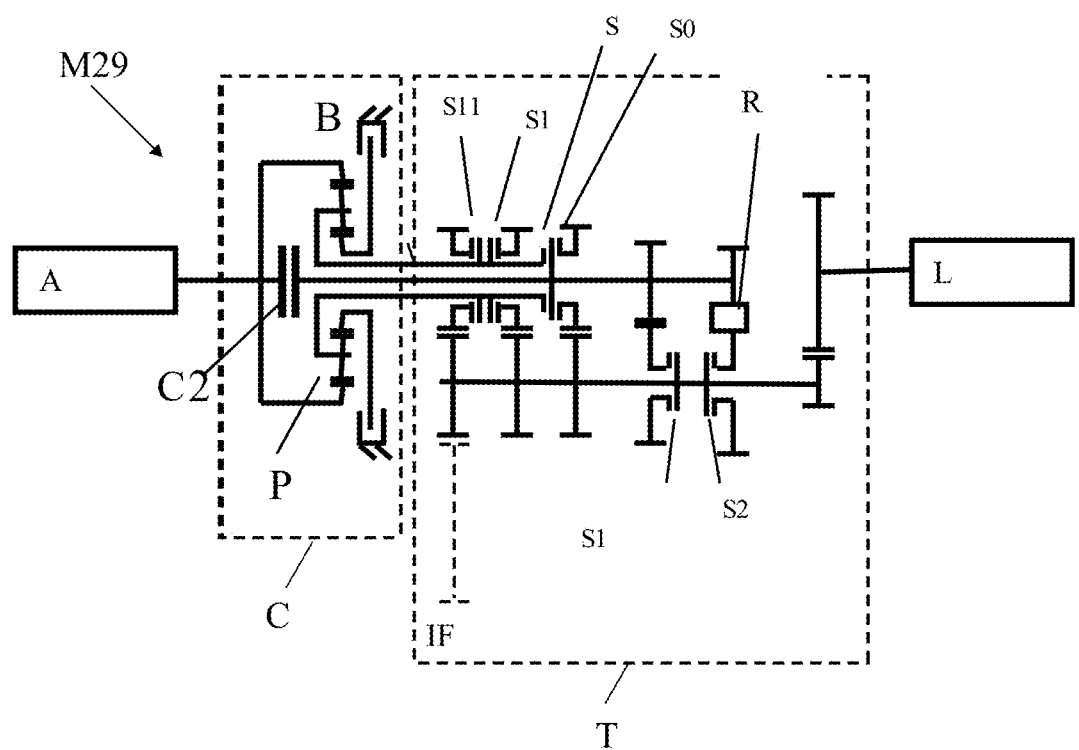

The transmission module may further include a reverse gear which may be located within T1 and T2 as well as between T1 and T2. In the transmission systems depicted in FIG. 5 as well as in FIGS. 35 and 36 depicted hereinafter, the reverse gear R is located within T2 and is arranged to be unsynchronized (without synchromesh).

If the reverse gear is located between T1 and T2, it may consist of two extra gearwheels, of which a first gearwheel is in meshing engagement with I1 or I" and a second gearwheel is in meshing engagement with I2 or I22. There may also be located a reverse clutch sr between the two extra gearwheels, which reverse clutch sr is preferably operated by a further switching fork. Furthermore, these two extra gearwheels are preferably positioned coaxially with the $2^{nd}$ lay shaft (having the same axis).

In the transmission systems shown in FIGS. 10 and 11, and 12 and 13 a further gear stage is located between the two outputs of the clutch module and/or the two inputs of the transmission module. The further clutch S is positioned coaxially relative to the first and/or second clutch means.

The further clutch S may be arranged as a friction clutch, a claw clutch, a synchromesh clutch or as a freewheel bearing/freewheel clutch. The clutch C1 may be arranged as a dry plate or a wet plate friction clutch. The clutch C2 may also be arranged as a dry plate or a wet plate friction clutch. The brake B may be arranged as a dry plate or wet plate friction brake.

The brake B is preferably arranged as a wet plate brake and the clutch C2 as a dry plate friction clutch, or the brake is arranged as a dry plate brake and the clutch C2 is arranged as a wet plate friction clutch.

A further gear stage may be located between the clutch C1 and the second output of the clutch module and/or between the clutch C2 and the second output of the clutch module.

The gear stage means P may be arranged as a bypass transmission (planetary gear set) having a minimum of 3 rotational members, of which a first member is connected to the input of the clutch module, a second member is connected to the first output of the clutch module and a third member is connected to the brake B. The first rotational member is preferably formed by a ring gear, the second by a planet carrier and the third member is formed by a sun gear.

The first and the second input shaft of the transmission module can be coupled directly to each other by means of at least one further clutch S.

The brake B is normally open. The clutch C1 and/or C2 are normally open or normally closed. The clutch C2 is operated by a pull rod or a push rod which passes through the input transmission shaft ($2^{nd}$ input shaft).

The sub-transmissions T1 and T2 comprise a minimum of one gear stage that can be switched on and off. The clutches s1, s11, s2, s22 etc. are located on the input side and/or on the output side of the gear stages I1, I11, I2, I22.

The first gearwheel from the final reduction IF to the differential may be the same gear wheel as the second gear wheel of the gear stage I1, where s1 is coaxial (has the same axis) with the further clutch S.

There may be present an electromotor (motor/generator) that can drive the vehicle. The electromotor may be coupled to any arbitrary shaft of the driving mechanism or the transmission system. This electromotor may be connected in such a way that it is also possible to drive completely electrically in which case the combustion engine can be disengaged from the drive line. The electromotor is preferably located between the drive source and the clutch module, or the electromotor is connected to the second output shaft of the clutch module and/or the second input shaft of the transmission module. The electromotor may be of assistance when switching from one gear to the next in such a way that the electromotor considerably reduces the energy dissipation of the clutch C2. The clutch C2 may be arranged as a claw clutch and/or synchromesh.

The above driving concepts may:
- be used for rear wheel drive, in which case the output shaft is connected to the rear differential by means of a differential gearbox;
- be used for four-wheel drive, in which case either the front wheel configuration (transversely mounted engine) or the rear wheel configuration (longitudinally mounted engine) is taken as a basis;
- be arranged to comprise any arbitrary planetary gear set with brake and clutch;
- be combined with all embodiments of the planetary gear set with brake and clutch shown in the above drawings;

be provided with any possible embodiments of a reverse gear; and be provided with any possible embodiments of a parking mechanism.

Figure 14:
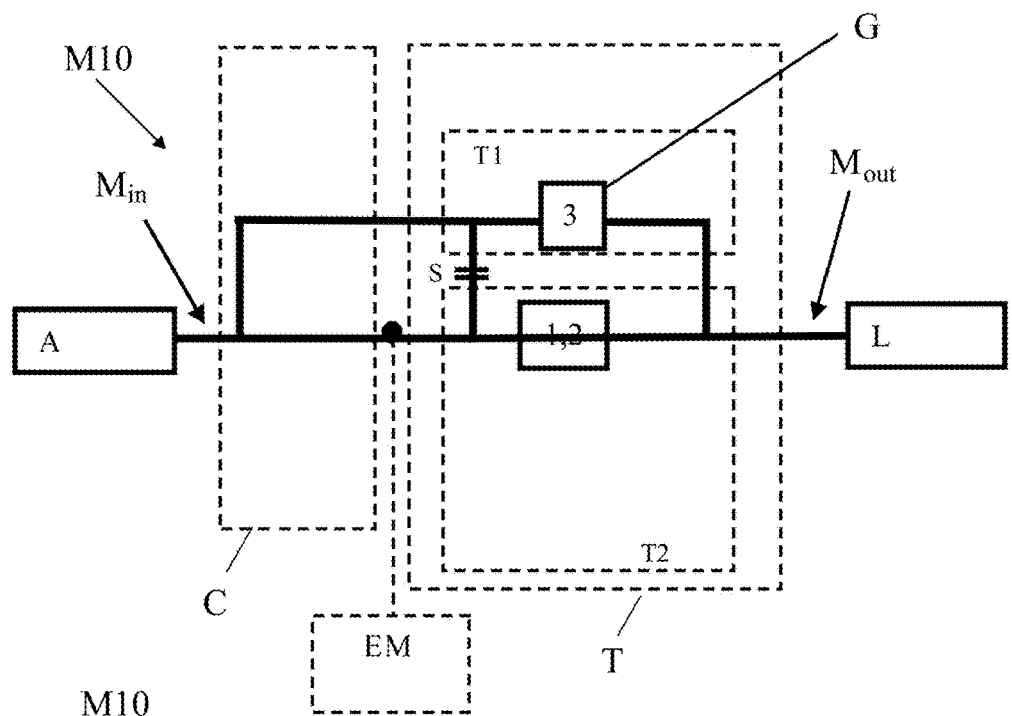
Figure 15:
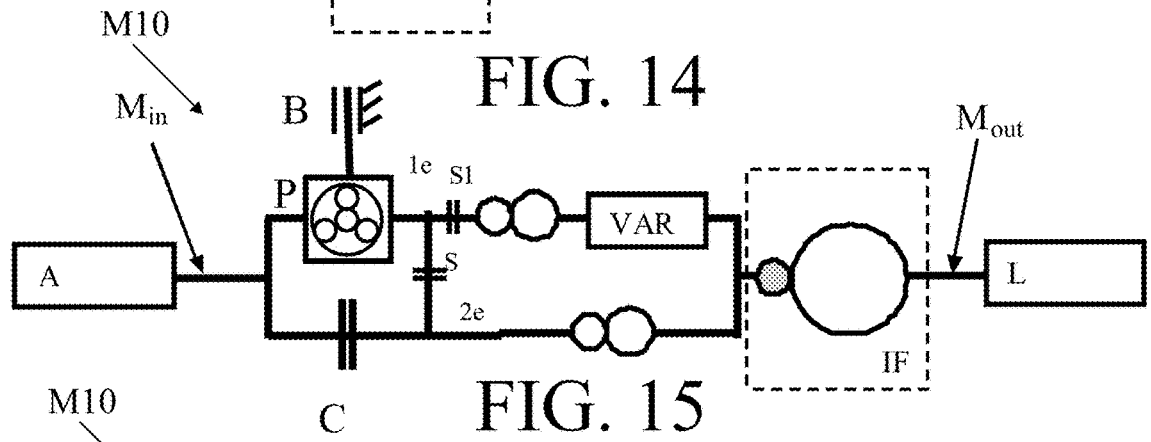
Figure 16:
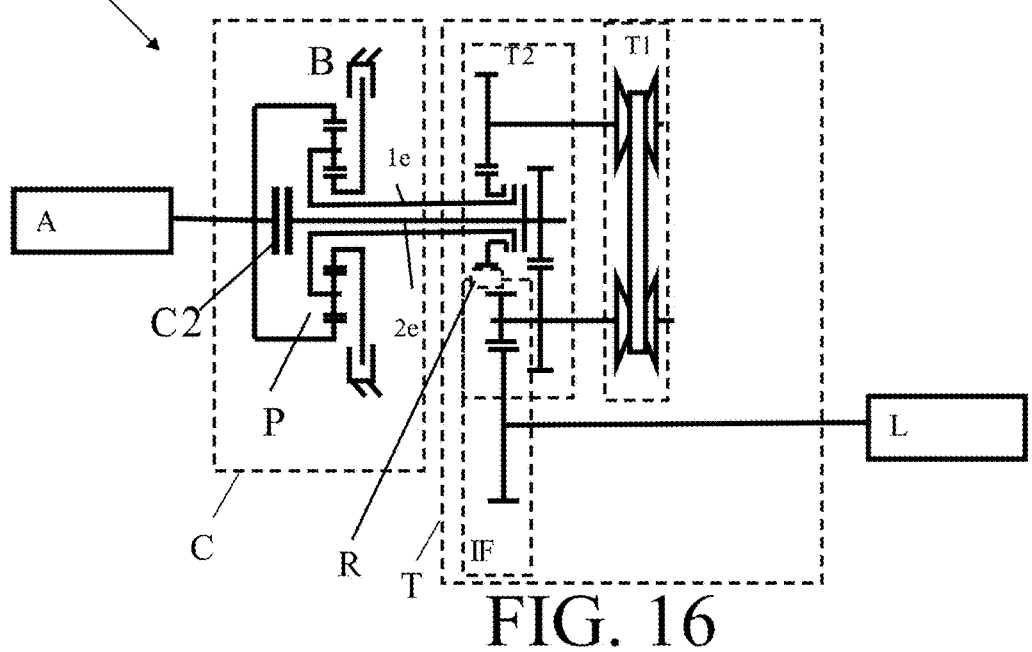

FIG. 14 shows a second functional variant of the transmission system comprising one gear stage in T1 and one gear stage in T2. FIGS. 15 and 16 show a constructive embodiment of this comprising a continuously variable transmission in T1. Transmission T2 or IF accommodates a reverse gear. Gear wheels of T2 and/or 12 form part of this.

By energizing brake B it is possible to drive off from standstill in both forward and reverse direction. The variator cannot be loaded then. When switching from brake to clutch the drive torque continues to be present. When the clutch is closed and the brake is open, the variator is still not loaded. Now it is possible to disengage the claw clutch and/or synchronizer S and close S1. By switching back from clutch to brake again it is possible to drive via the variator and realise higher gears. So there are two drive-off gears over the gear wheels and the $3^{rd}$ gear and upwards (3-10) can be realised by means of the variator. As a result, an extremely large ratio coverage can be achieved. Besides, the variator may be arranged as a much smaller version (RC between 3 and 4).

Figure 17:
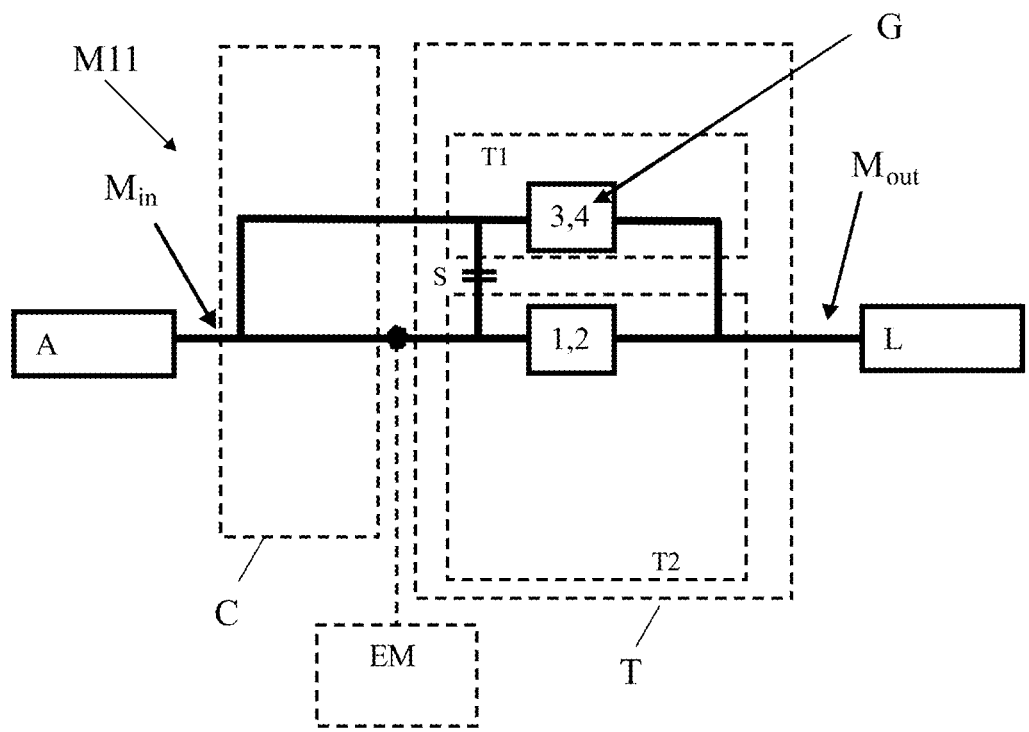
Figure 18:
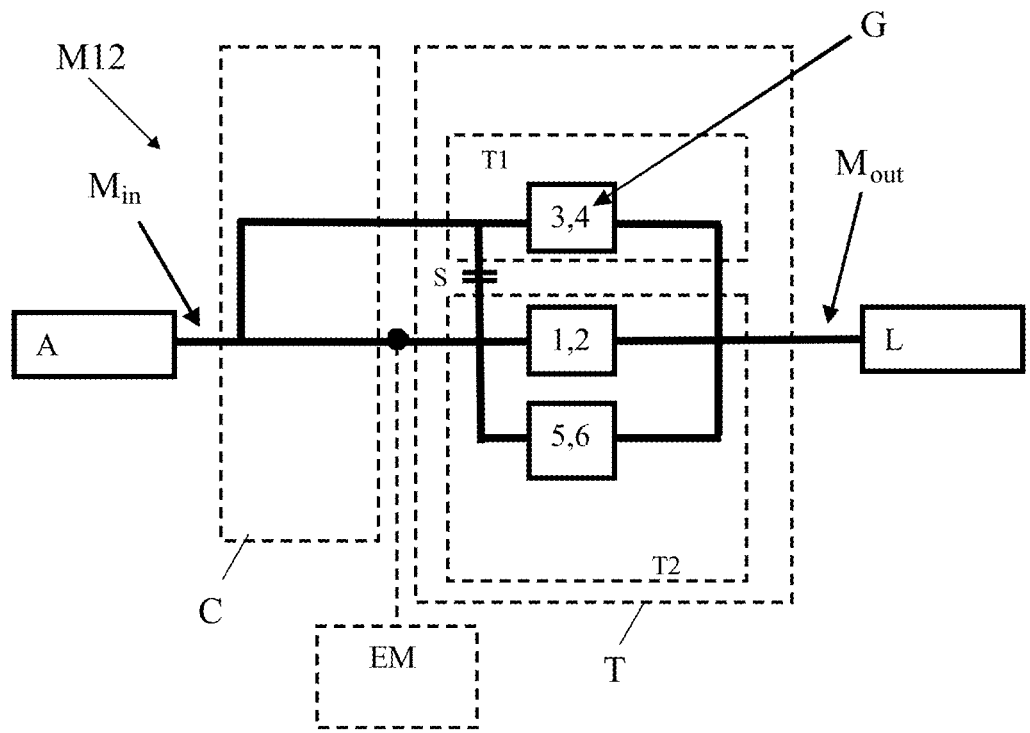
Figure 19:
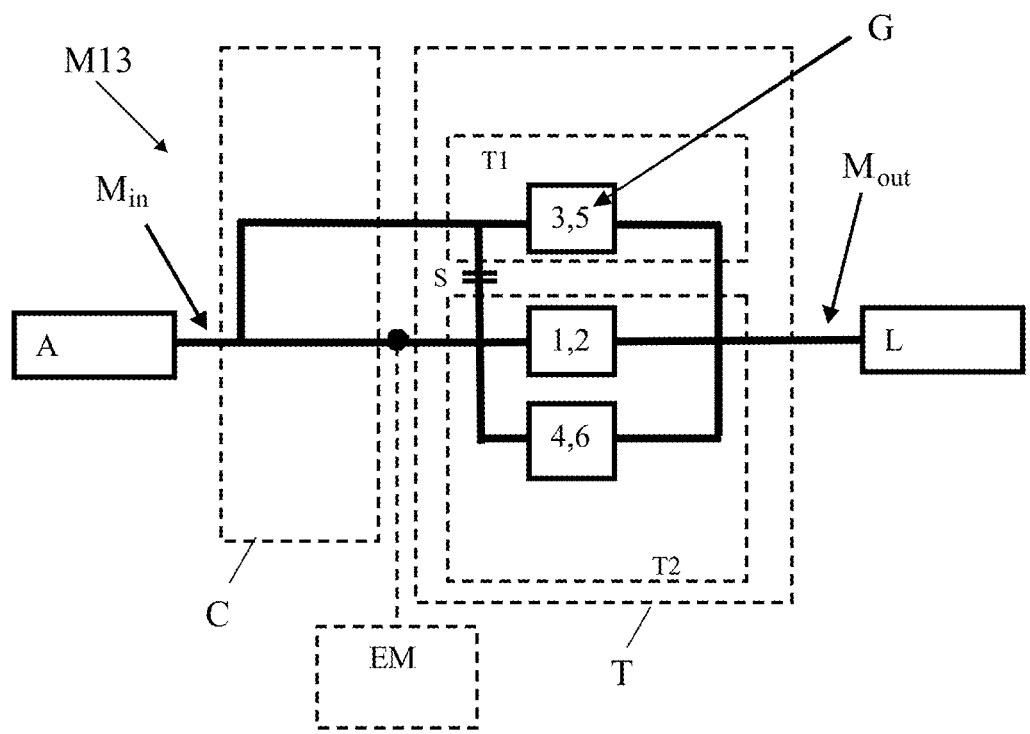
Figure 20:
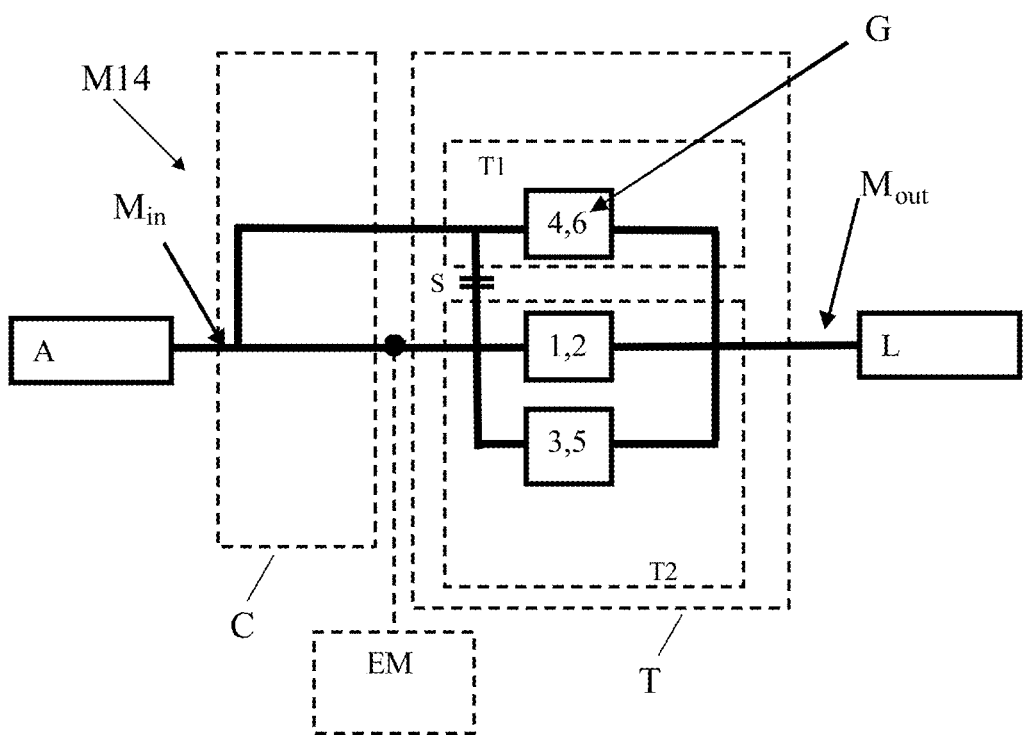
Figure 21:
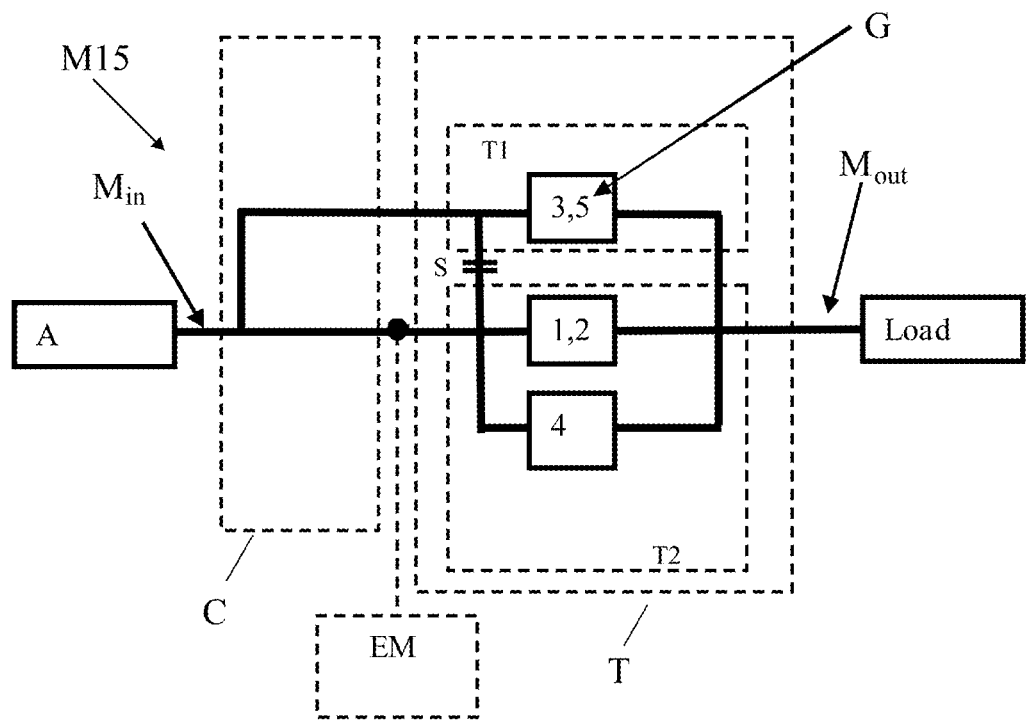
Figure 22:
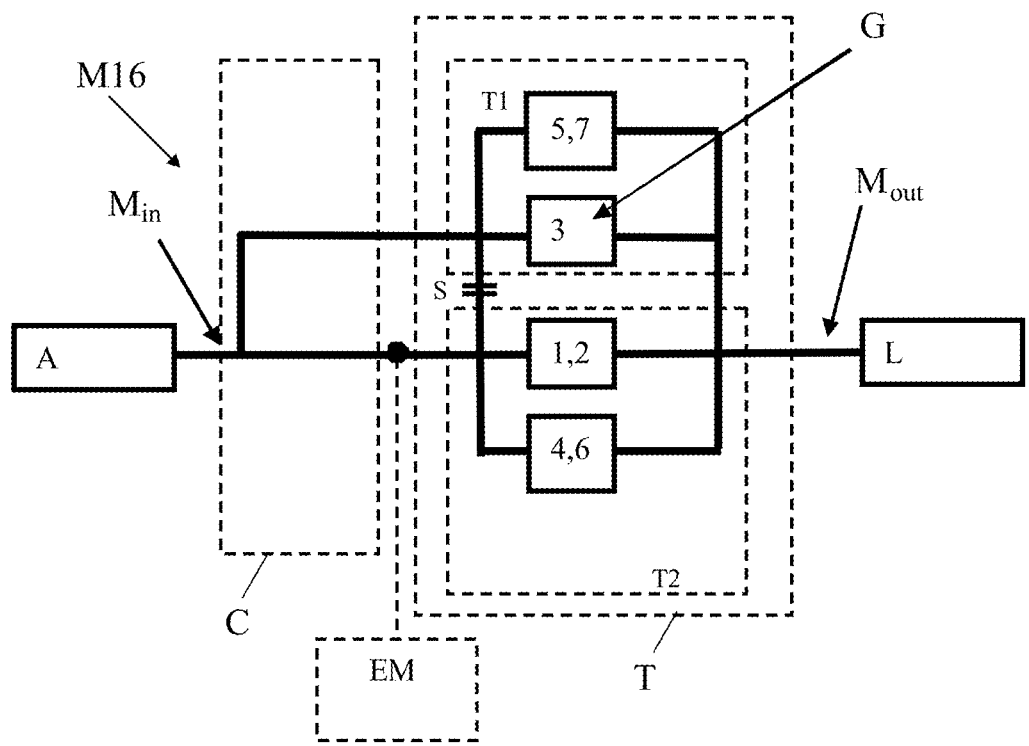
Figure 23:
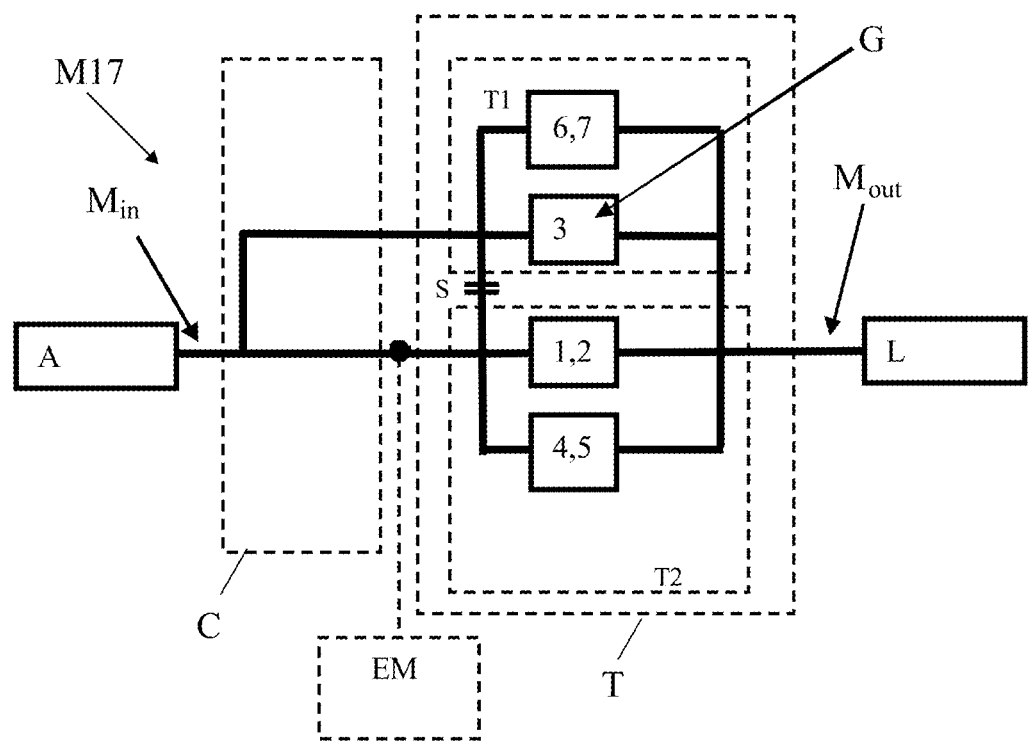
Figure 24:
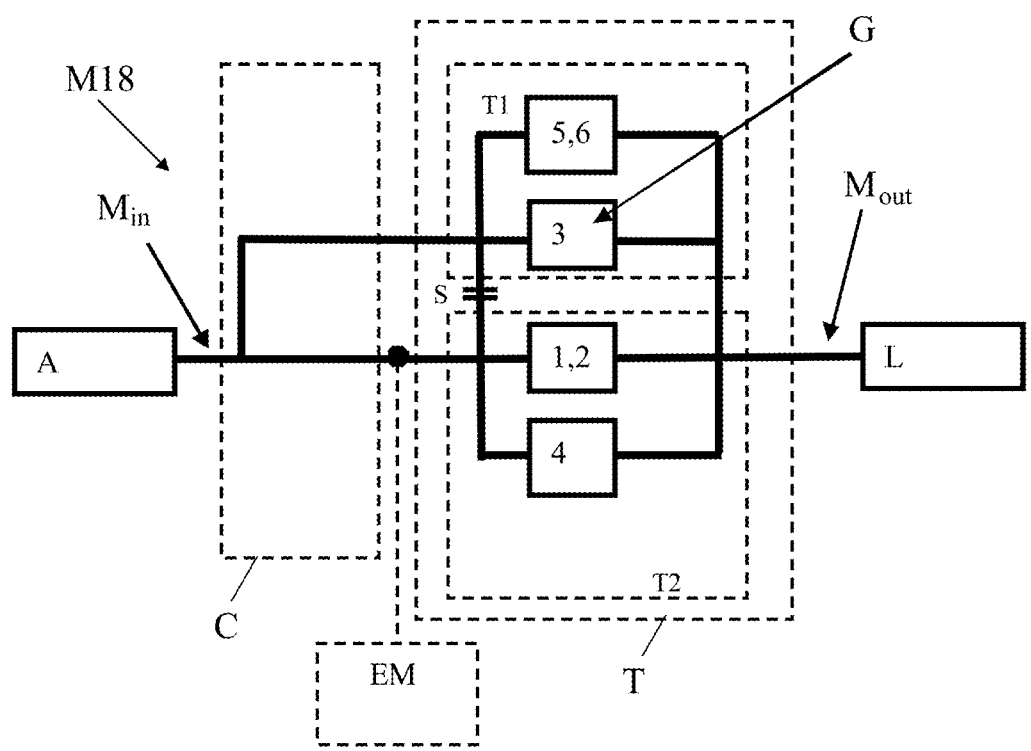
Figure 25:
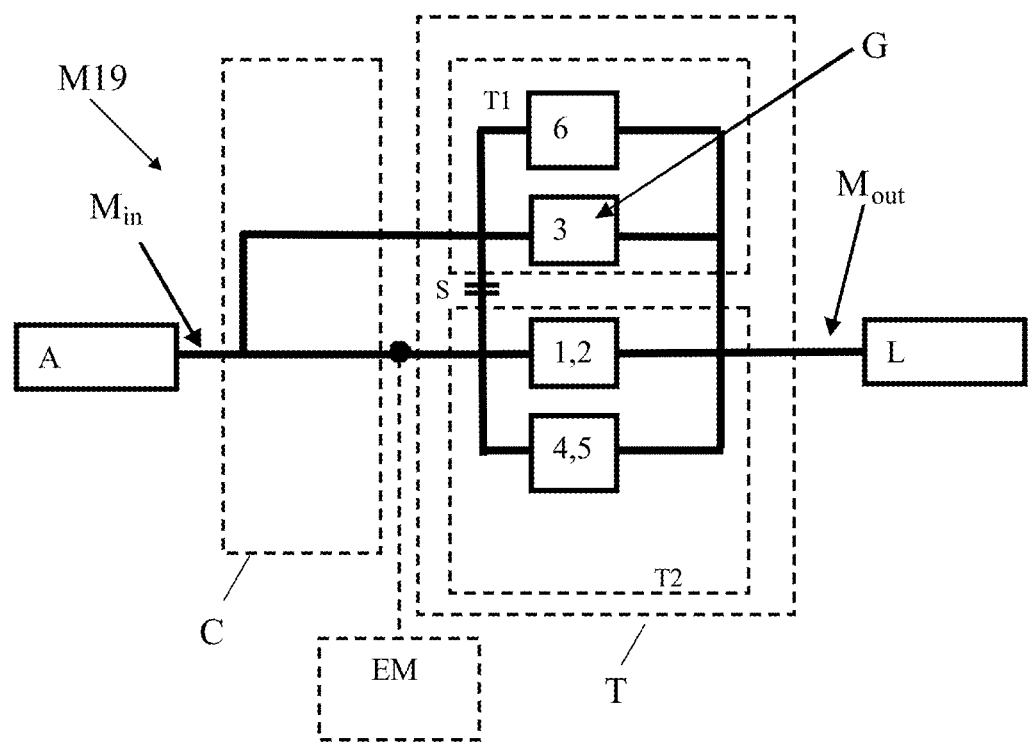
Figure 26:
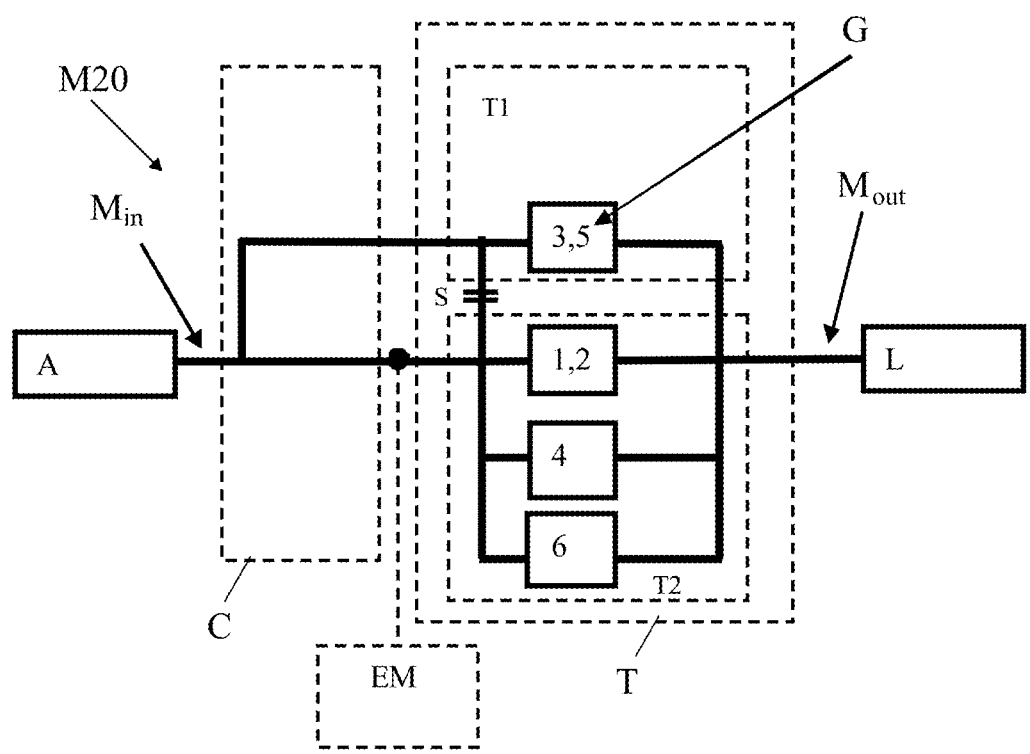
Figure 27:
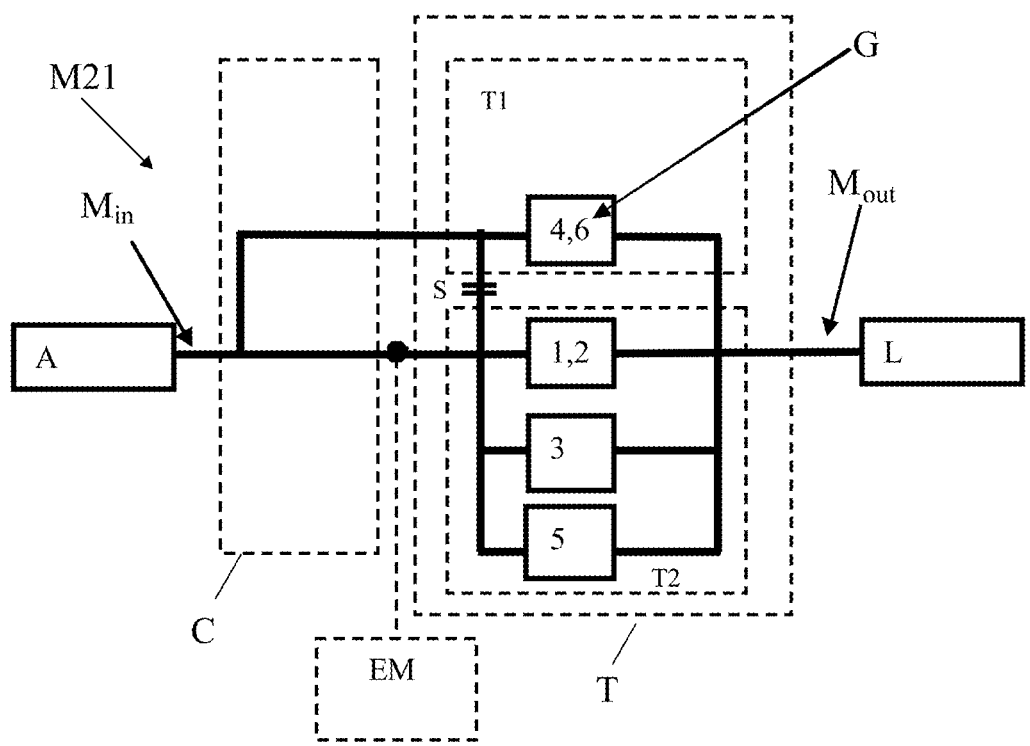
Figure 28:
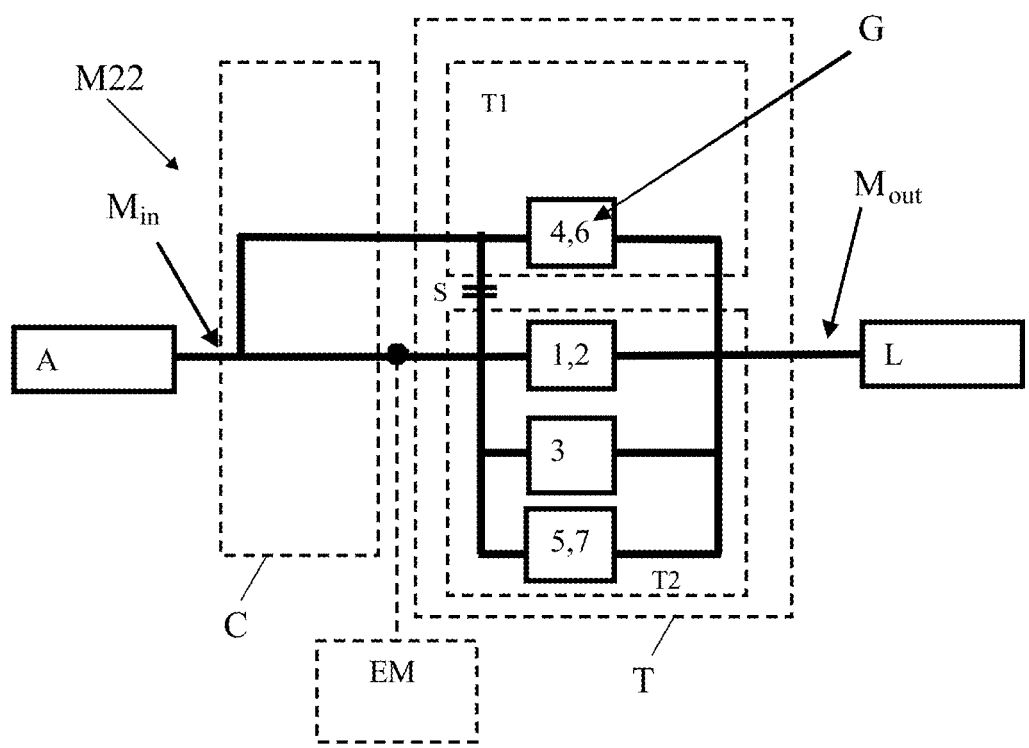
Figure 29:
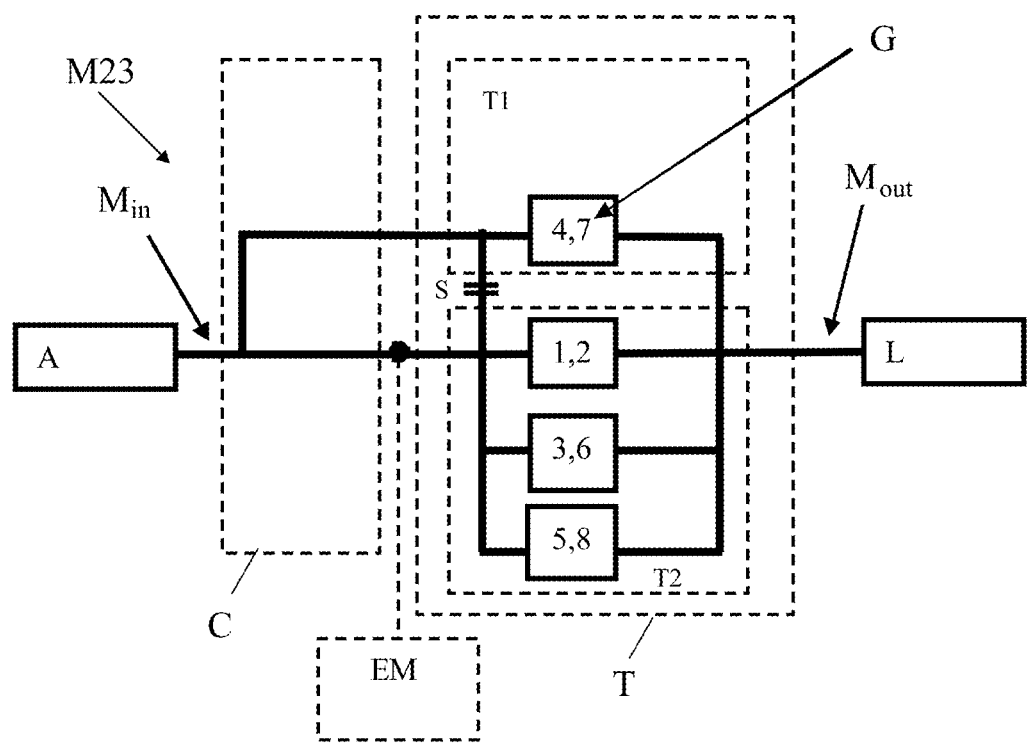
Figure 30:
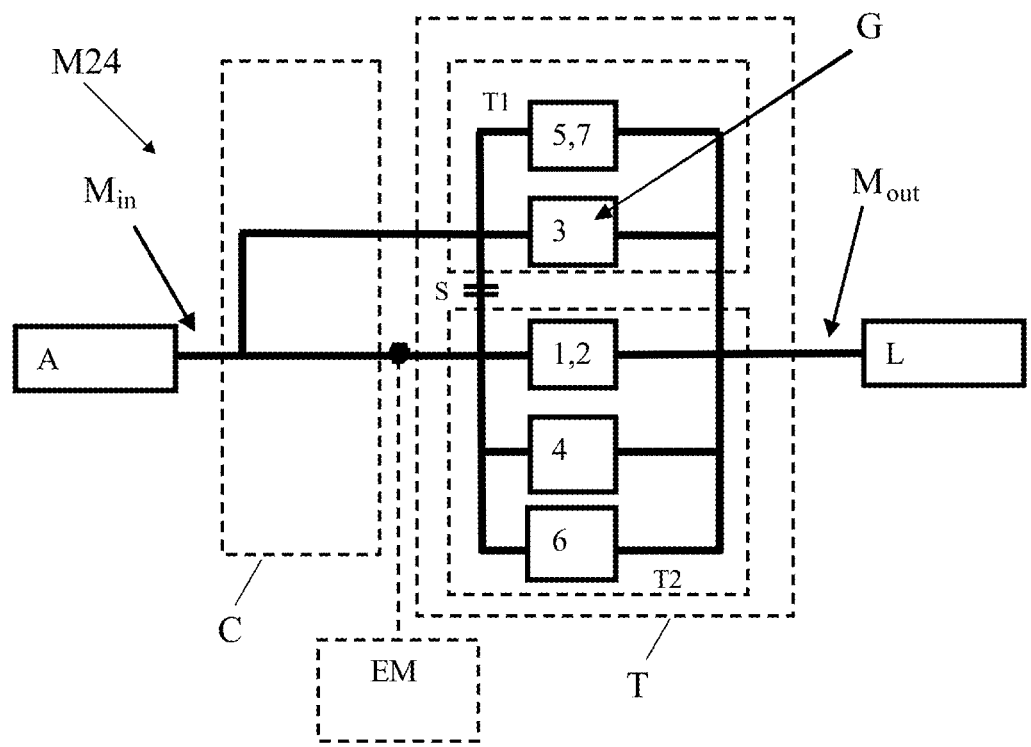
Figure 31:
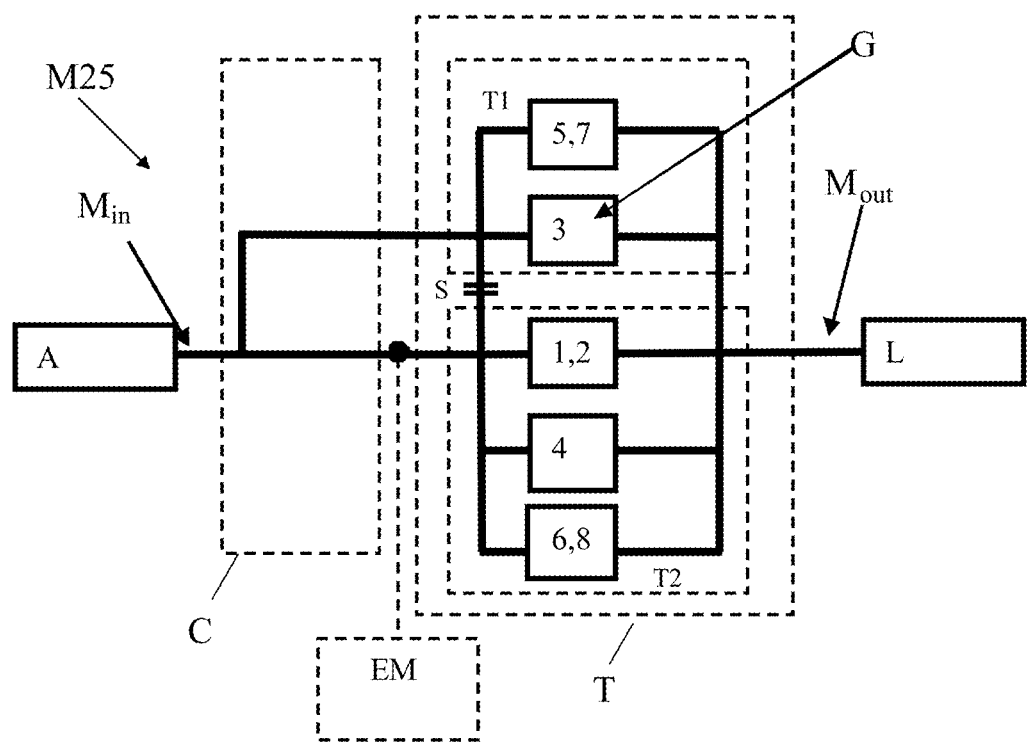
Figure 32:
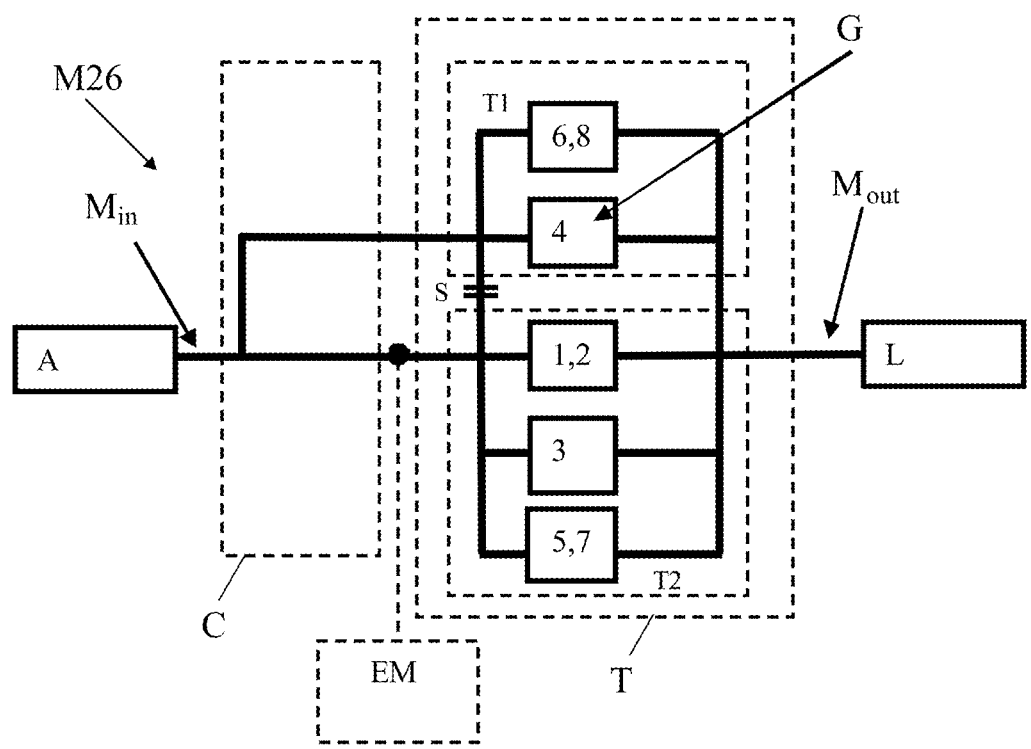
Figure 33:
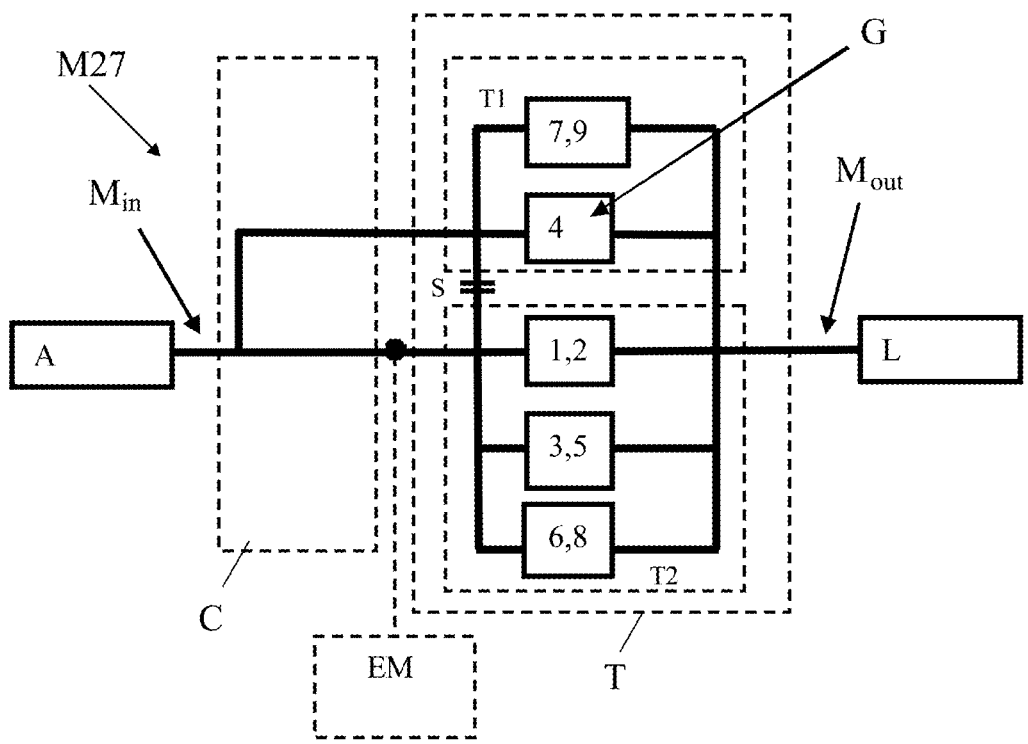
Figure 34:
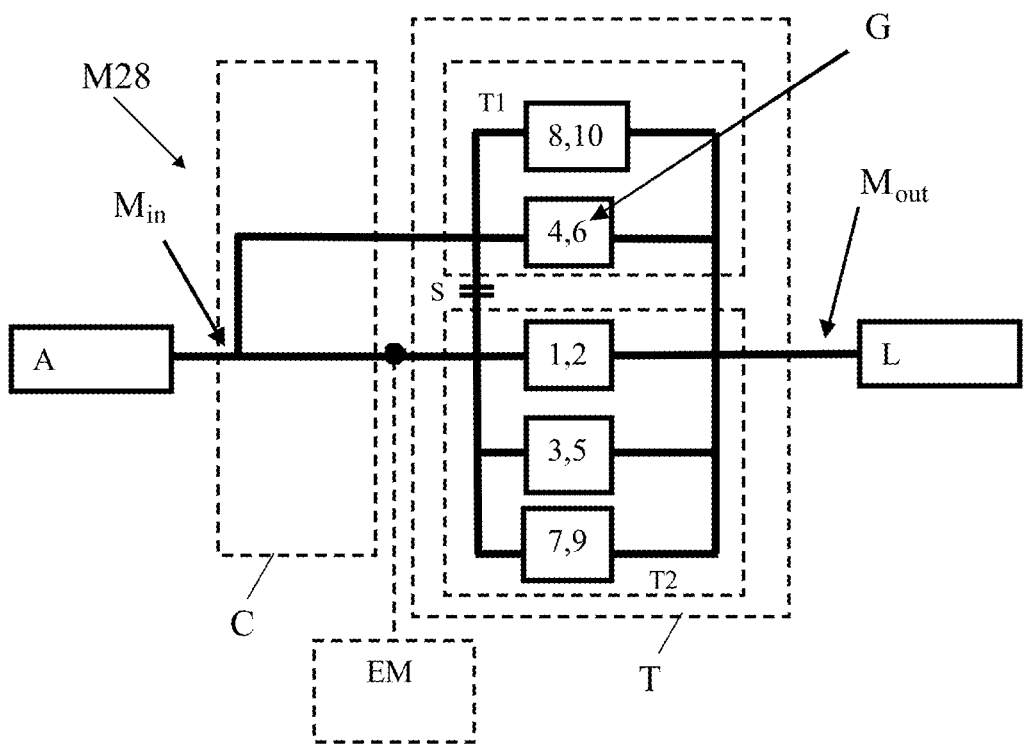
Figure 37:
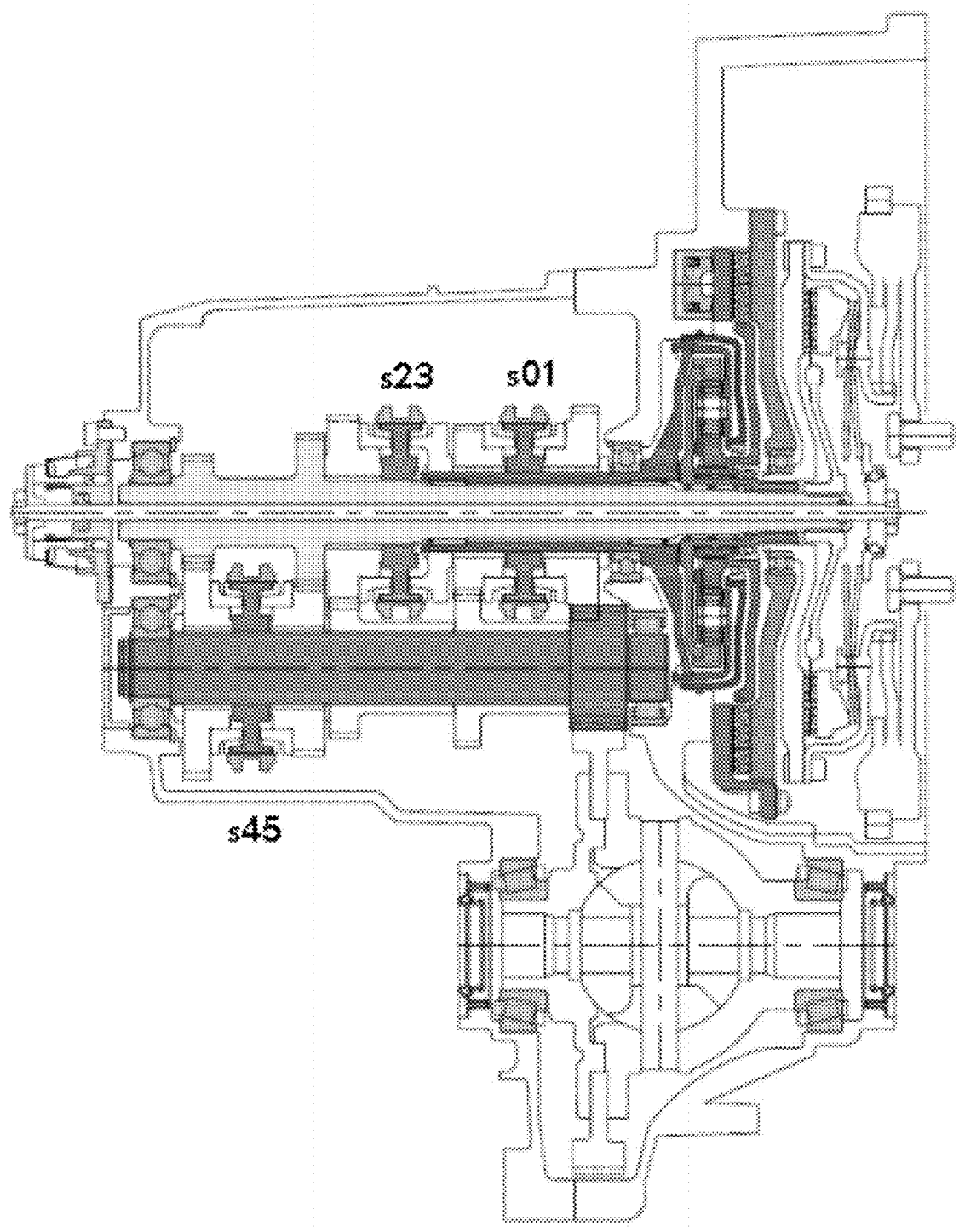
Figure 38:
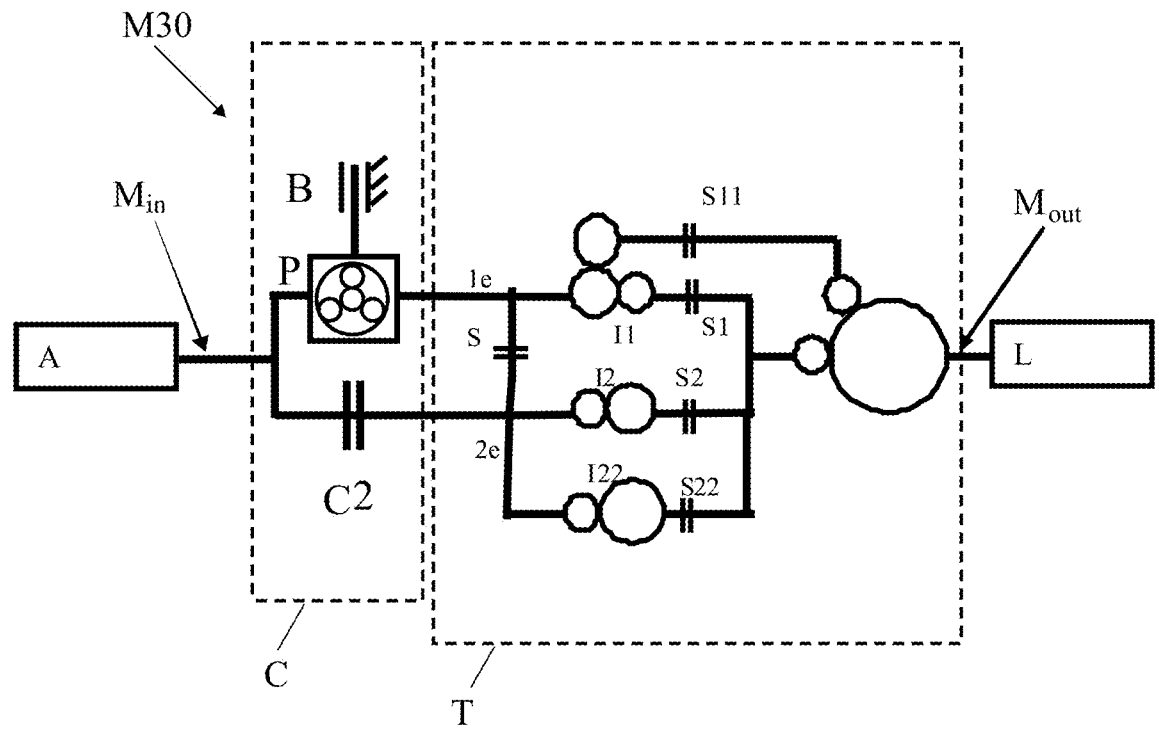
Figure 39:
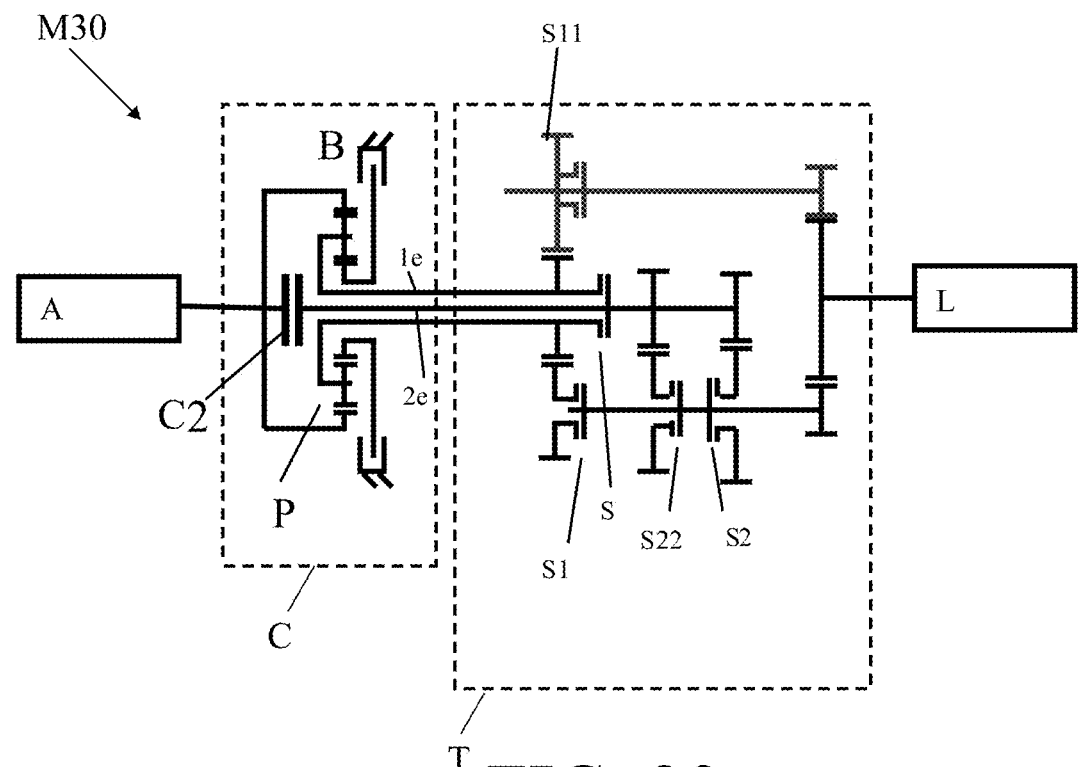
Figure 40:
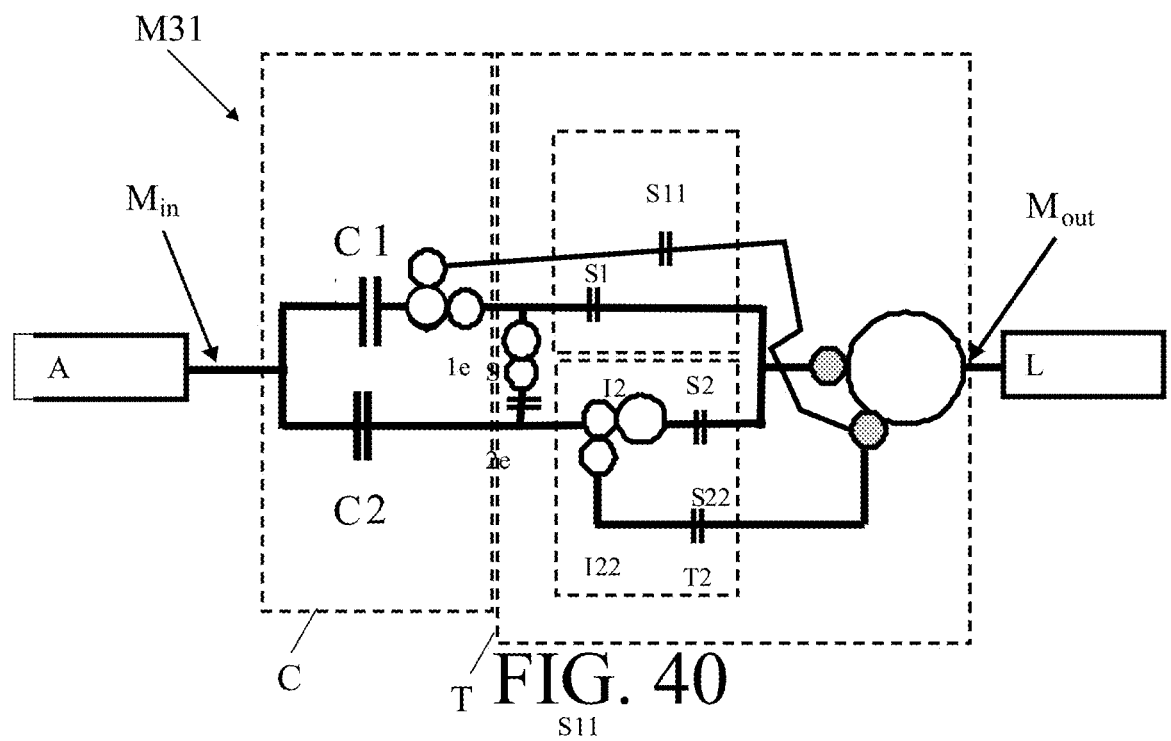
Figure 41:
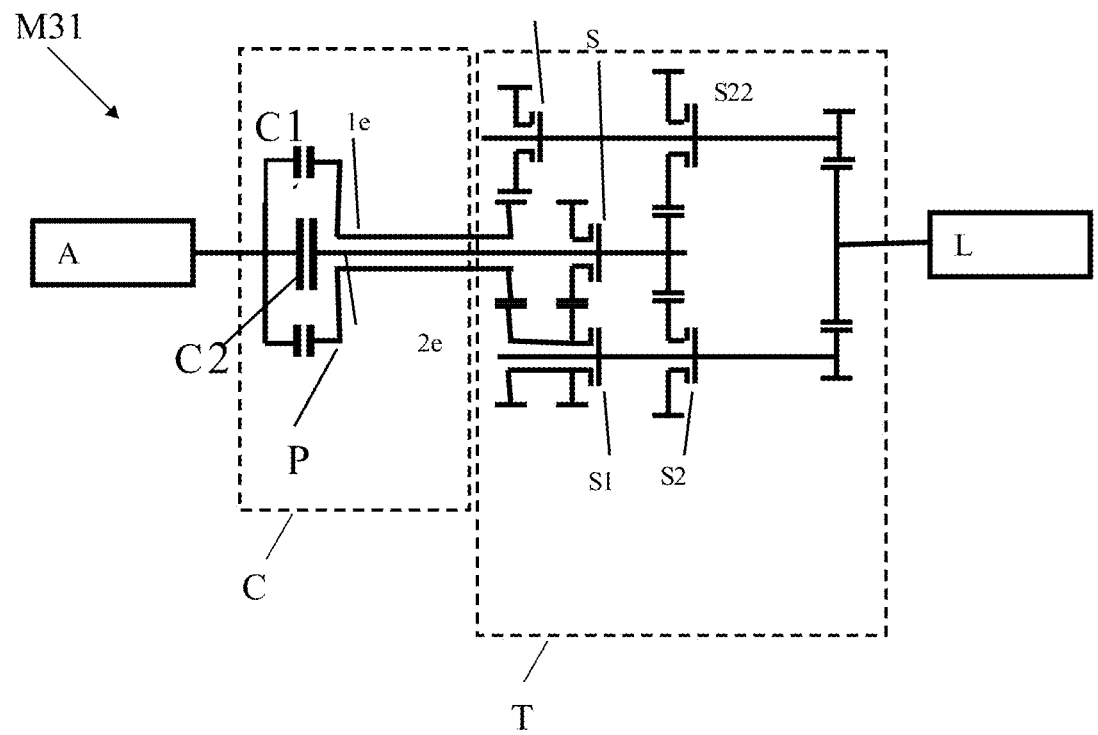
Figure 42:
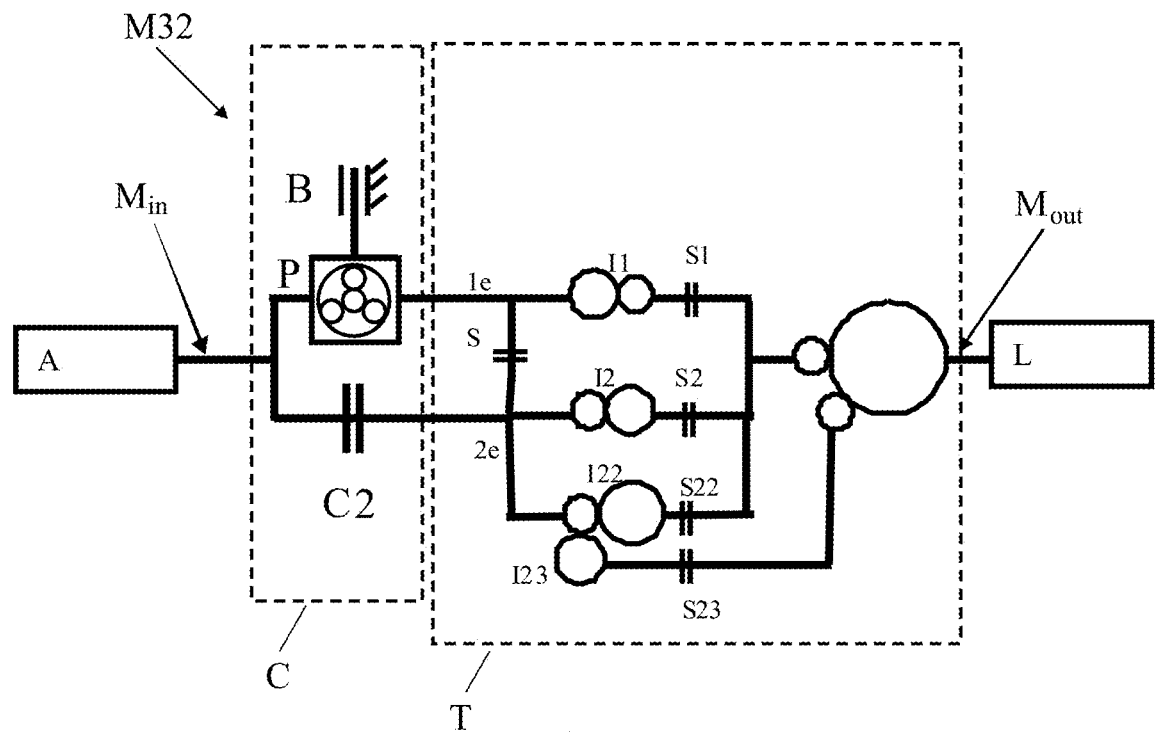
Figure 43:
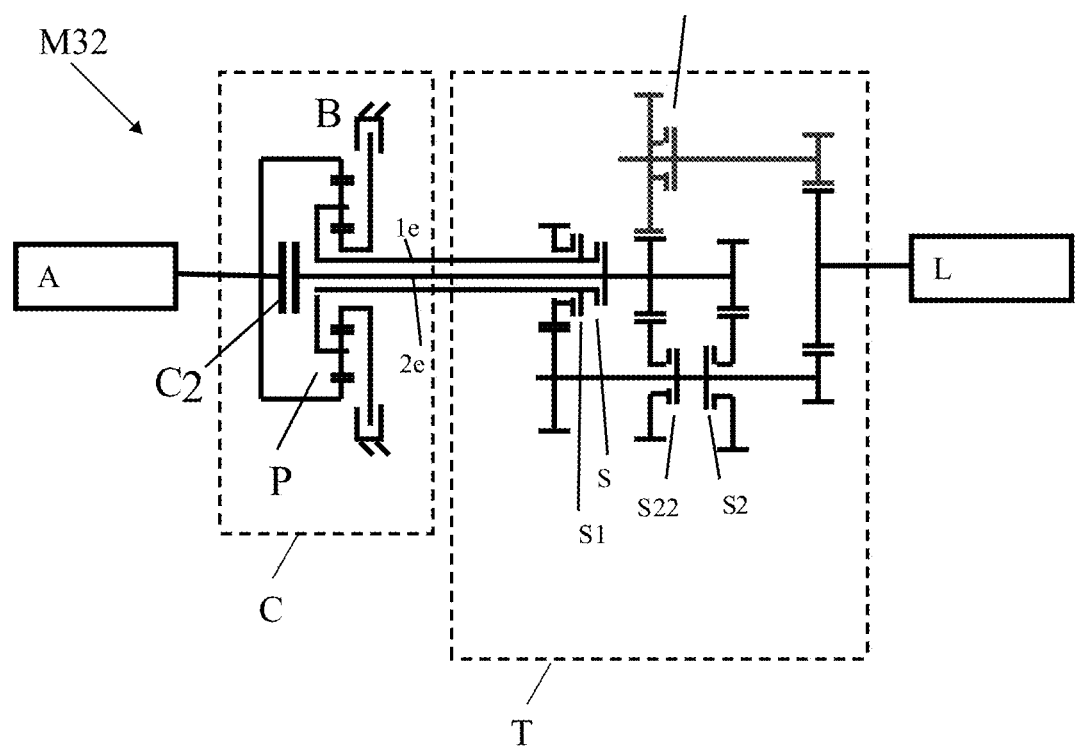
Figure 44:
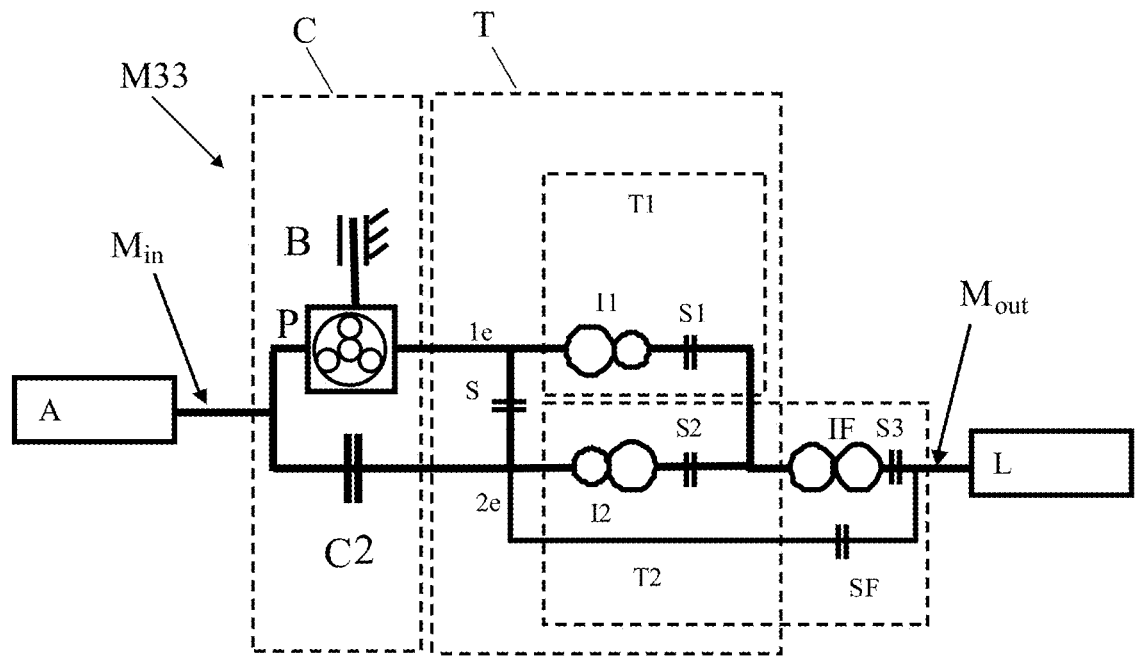
Figure 45:
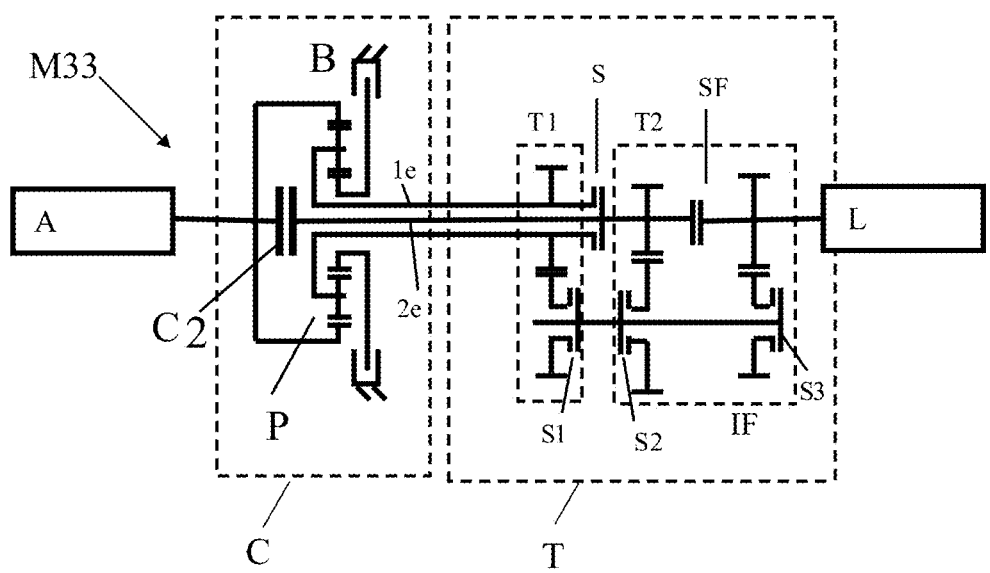

FIG. 17 shows a third functional variant of the transmission system comprising one gear stage in T1 and one gear stage in T2;

FIG. 18 shows a fourth functional variant of the transmission system comprising one gear stage in T1 and two gear stages in T2;

FIG. 19 shows a fifth functional variant of the transmission system comprising one gear stage in T1 and two gear stages in T2;

FIG. 20 shows a sixth functional variant of the transmission system comprising one gear stage in T1 and two gear stages in T2;

FIG. 21 shows a seventh functional variant of the transmission system comprising one gear stage in T1 and two gear stages in T2;

FIG. 22 shows an eighth functional variant of the transmission system comprising two gear stages in T1 and two gear stages in T2;

FIG. 23 shows a ninth functional variant of the transmission system comprising two gear stages in T1 and two gear stages in T2;

FIG. 24 shows a tenth functional variant of the transmission system comprising two gear stages in T1 and two gear stages in T2;

FIG. 25 shows an eleventh functional variant of the transmission system comprising two gear stages in T1 and two gear stages in T2;

FIG. 26 shows a twelfth functional variant of the transmission system comprising one gear stage in T1 and three gear stages in T2;

FIG. 27 shows a thirteenth functional variant of the transmission system comprising one gear stage in T1 and three gear stages in T2;

FIG. 28 shows a fourteenth functional variant of the transmission system comprising one gear stage in T1 and three gear stages in T2;

FIG. 29 shows a fifteenth functional variant of the transmission system comprising one gear stage in T1 and three gear stages in T2;

FIG. 30 shows a sixteenth functional variant of the transmission system comprising two gear stages in T1 and three gear stages in T2;

FIG. 31 shows a seventeenth functional variant of the transmission system comprising two gear stages in T1 and three gear stages in T2;

FIG. 32 shows an eighteenth functional variant of the transmission system comprising two gear stages in T1 and three gear stages in T2;

FIG. 33 shows a nineteenth functional variant of the transmission system comprising two gear stages in T1 and three gear stages in T2;

FIG. 34 shows a twentieth functional variant of the transmission system comprising two gear stages in T1 and three gear stages in T2;

FIGS. 35, 36 and 37 show a constructive embodiment of the eighth to twelfth variant comprising one lay shaft;

FIGS. 38 and 39 show a constructive embodiment of the eighth to twelfth variant comprising two lay shafts;

FIGS. 40 and 41 show a further constructive embodiment of the eighth to twelfth variant comprising two lay shafts;

FIGS. 42 and 43 show a constructive embodiment of the thirteenth to fifteenth variant comprising two lay shafts;

FIGS. 44 to 51 show examples of constructive embodiments for rear-wheel drive comprising clutches SF and/or S3. The variants described below with clutch SF (without S3) have the same functionality as the above variants 1 to 7, but the input shaft and output shaft of the transmission system are positioned coaxially (have the same axis). This is pre-eminently suitable for rear-wheel drive vehicles, such as (light) trucks and buses. IF is substituted for gear stage I22 and SF is substituted for clutch S22. With extra clutch S3 it is possible to realise an extra gear via I1, I2 and SF without the need for adding extra gear wheels.

Figure 46:
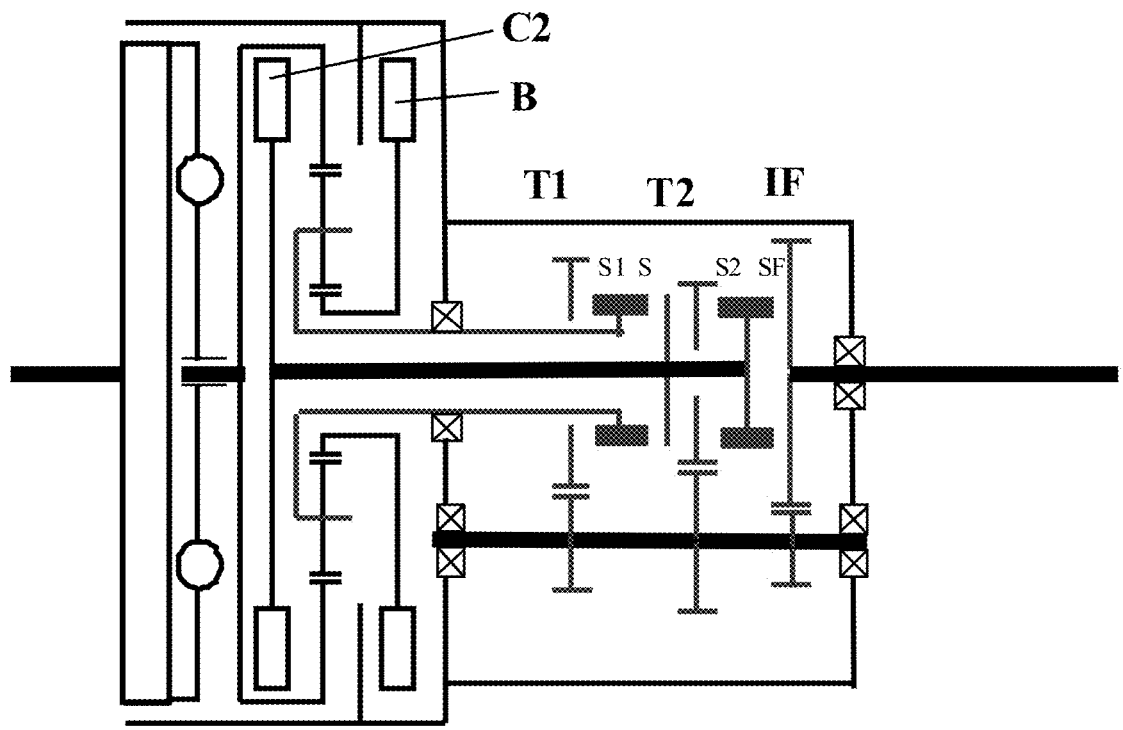
Figure 47:
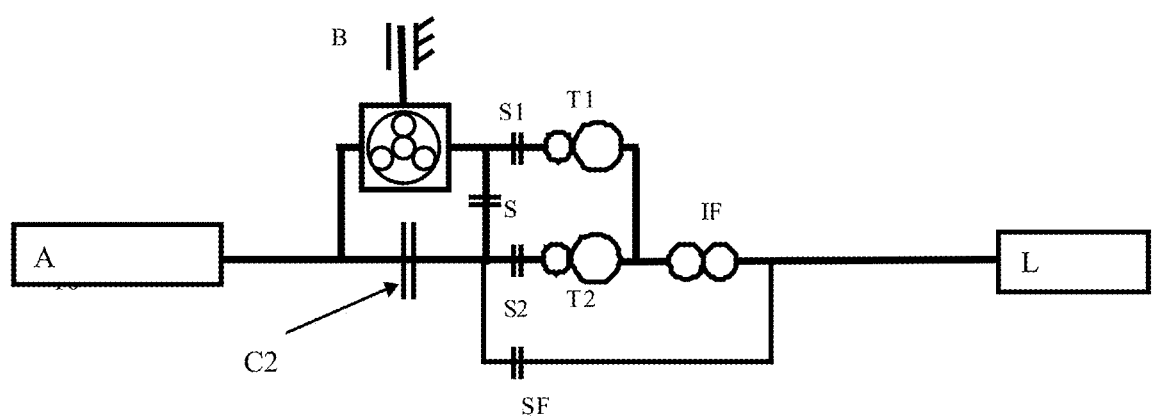

FIGS. 46 and 47 show an embodiment of a five gear transmission in which S1 and S are operated by means of one switching fork and so are S2 and SF.

Based on the following reductions the gears mentioned below are formed:

Reduction T1=1.4 (1.0)
Reduction T2=2.74 (1.96)
Reduction IF=1.0 (1.4)
$1^{st}$ gear 3.84 (brake, s, s2 closed)
$2^{nd}$ gear 2.74 (clutch, s2 closed)
$3^{rd}$ gear 1.96 (brake, s1 closed)
$4^{th}$ gear 1.4 (clutch, s, s1 closed)
$5^{th}$ gear (brake, s, sf closed) (clutch, sf closed)

It is possible to switch between the first group of gears (1 to 5) while retaining torque transfer by changing torque transfer between brake and clutch, in which case the clutches s1, s2 and s can be switched on or off while being unloaded.

However, switching between the $3^{rd}$ gear and the $4^{th}$ gear while retaining the torque is somewhat more difficult. In the $3^{rd}$ gear sf may be closed so that the torque transfer can be taken over by means of friction clutch C. Subsequently, by energizing the clutch C, the $5^{th}$ gear can be applied. Before the $5^{th}$ gear has been synchronized also the $4^{th}$ gear can be applied by switching from s1 to s and closing the brake. Starting from this situation is easy to switch to the $5^{th}$ gear by changing from brake to clutch.

Figure 48:
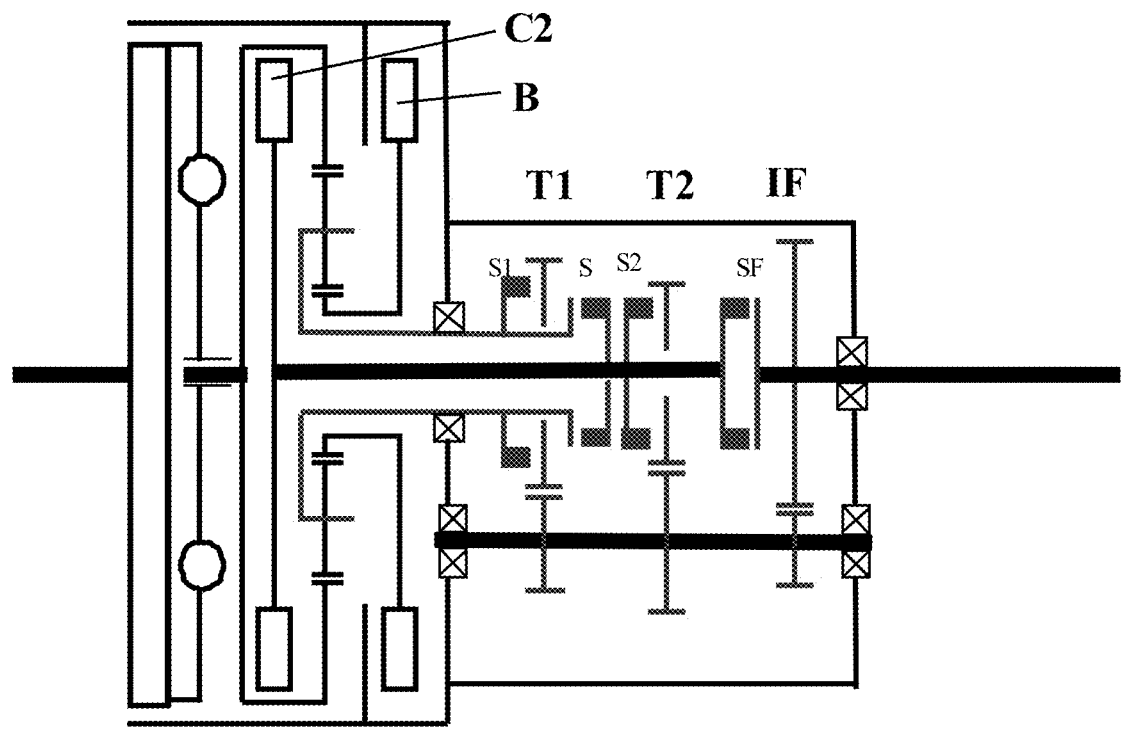
Figure 49:
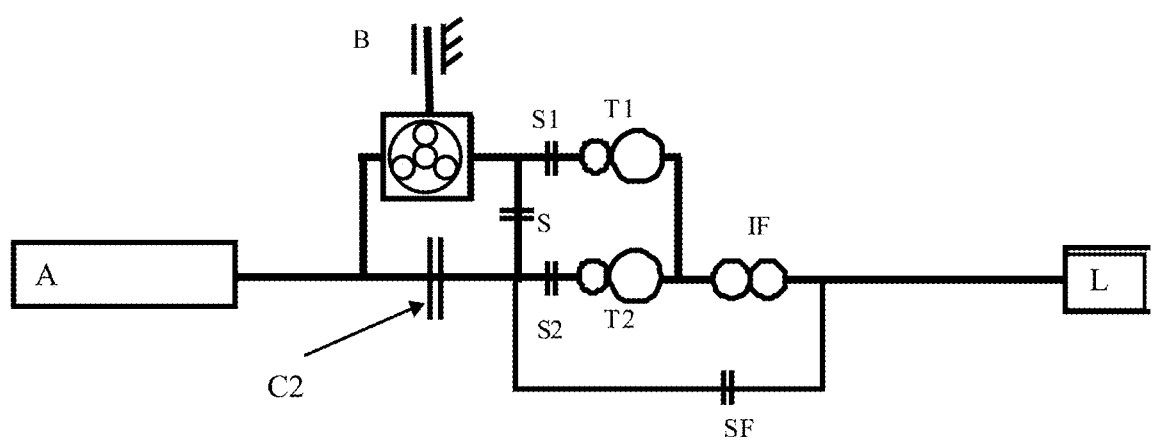

FIGS. 48 and 49 show an embodiment of a six gear transmission by the individual operation of S1 and S2.

Based on the following reductions the gears mentioned below are formed:

Reduction T1=1.96
Reduction T2=3.84
Reduction IF=1.0
$1^{st}$ gear 5.38 (brake, s, s2 closed)
$2^{nd}$ gear 3.84 (clutch, s2 closed)
$3^{rd}$ gear 2.74 (brake, s1 closed)

$4^{th}$ gear 1.96 (clutch, s, s1 closed)
$5^{th}$ gear 1.4 (brake, s, sf closed)
$6^{th}$ gear 1.0 (clutch, sf closed)

It is possible to switch between the first group of gears ($1^{st}$ to $4^{th}$), while retaining torque transfer, by changing torque transfer between brake and clutch, in which case the clutches s1, s2 and s can be switched on or off while being unloaded.

It is possible to switch between the second group of gears (5 and 6), while retaining torque transfer, by changing torque transfer between brake and clutch, in which case the clutch s can be switched on or off while being unloaded.

However, switching between the first and second group, while retaining torque, is somewhat more difficult. For this purpose it must be possible to switch on sf without loading it. However, this is possible indeed by switching for example from the $3^{rd}$ gear to the $6^{th}$ gear. In $3^{rd}$ gear sf can be closed so that torque transfer can be taken over by means of the friction clutch C. Then the $6^{th}$ gear can be operated by closing the clutch C. Before the $6^{th}$ gear has been synchronized, the $5^{th}$ gear can be operated already. From this situation any gear in the second group can be reached while torque is retained.

Figure 50:
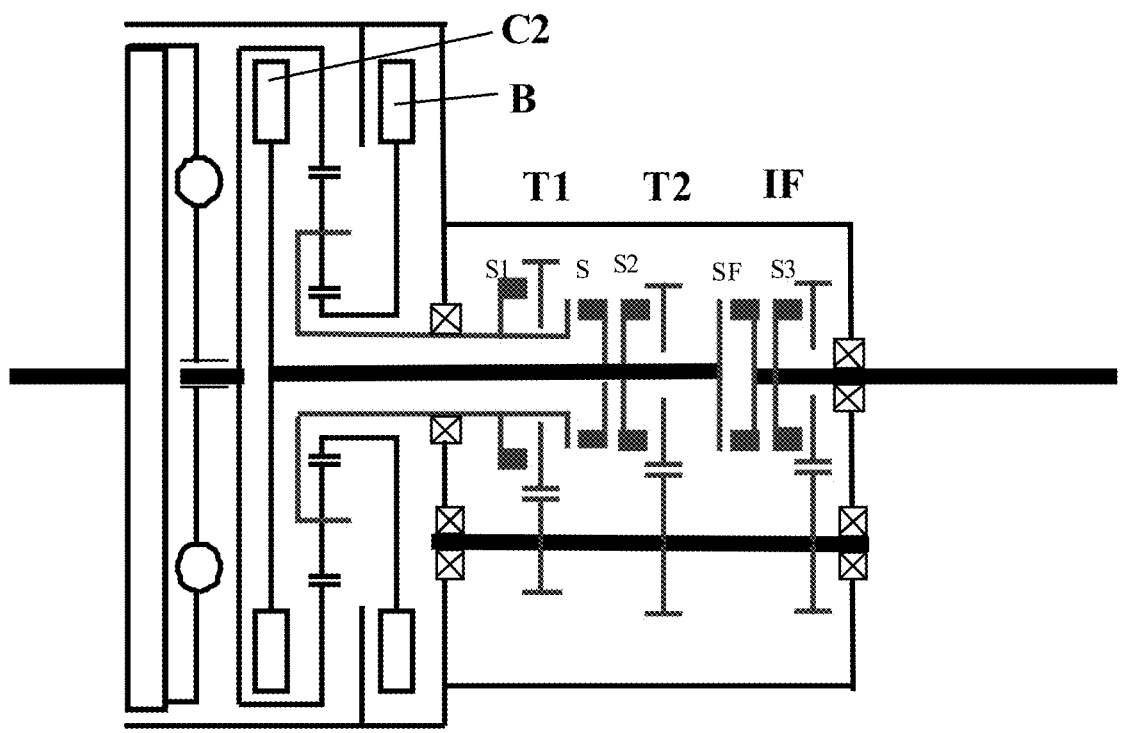
Figure 51:
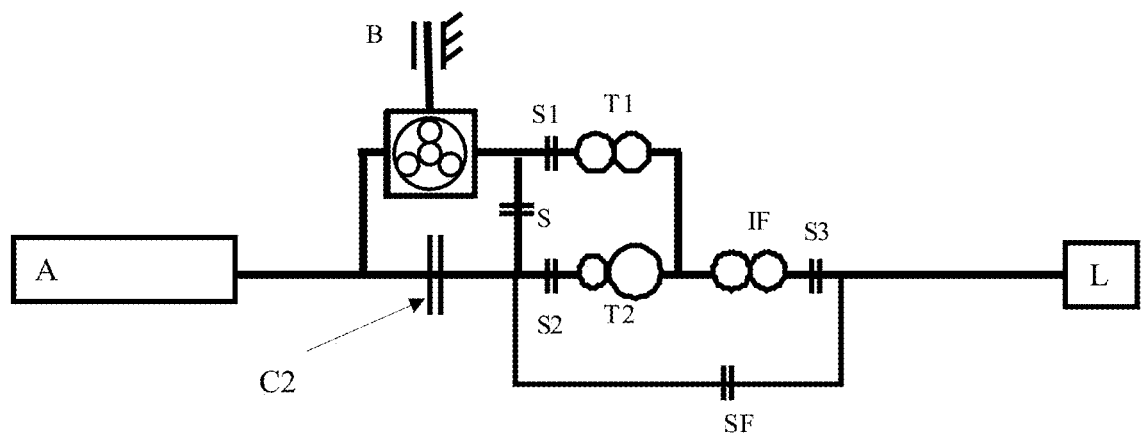

FIGS. 50 and 51 show an embodiment of a seven gear transmission by the addition of S3.

Based on the following reductions the gears mentioned below are formed:
Reduction T1=1.96
Reduction T2=3.84
Reduction IF=1.0
$1^{st}$ gear 5.38 (brake, s, s2, s3 closed)
$2^{nd}$ gear 3.84 (clutch, s2, s3 closed)
$3^{rd}$ gear 2.74 (brake, s1, s3 closed)
$4^{th}$ gear 1.96 (clutch, s, s1, s3 closed)
$5^{th}$ gear 1.4 (brake, s, sf closed)
$6^{th}$ gear 1.0 (clutch, sf closed)
$7^{th}$ gear 0.71 (brake, s1, s2, sf closed)

It is possible to switch between the first group of gears ($1^{st}$ to $4^{th}$) while retaining torque transfer by changing torque transfer between the brake and the clutch, in which case the clutches s, s1, s2 and s3 can be switched on or off while being unloaded.

It is possible to switch between the second group of gears ($5^{th}$ to 7th) while retaining torque transfer by changing torque transfer between the brake and the clutch, in which case the clutch s, s1, s2 and sf can be switched on or off while being unloaded.

Figure 52:
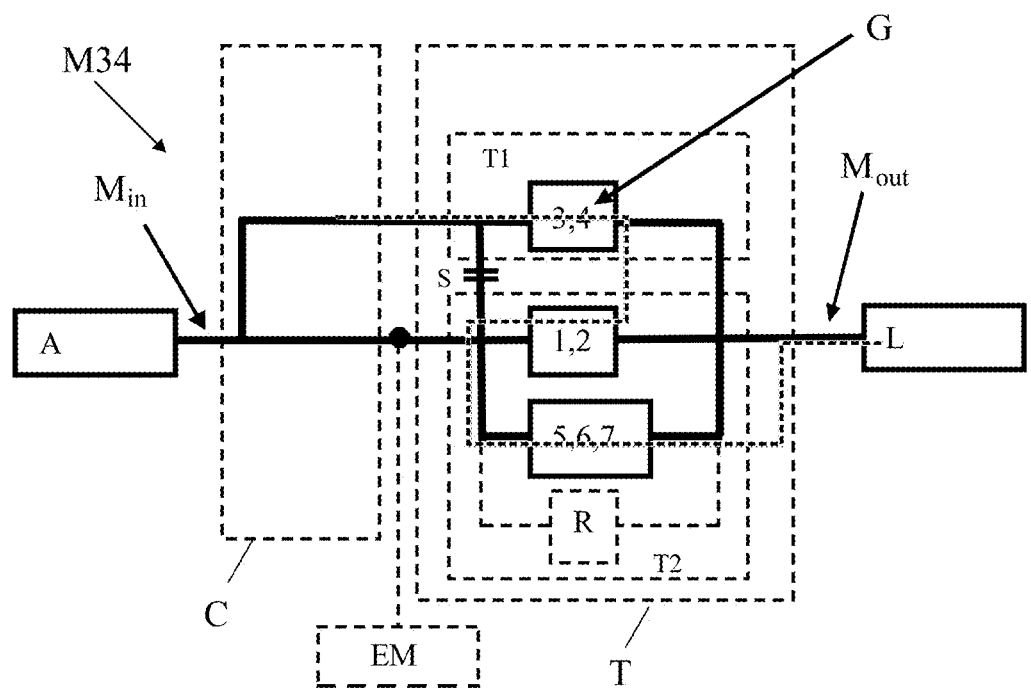

However, switching between the first and second group while retaining torque is somewhat more difficult. For this purpose it must be possible to switch between s3 and sf without loading it. However, this is possible indeed by switching for example from the $3^{rd}$ gear to the $6^{th}$ gear. In $3^{rd}$ gear sf can be closed so that torque transfer can be taken over by means of the friction clutch C, so that s3 is no longer loaded and can be opened, see FIG. 52. Then the $6^{th}$ gear can be applied by closing the clutch C. Before the $6^{th}$ gear has been synchronized, the $5^{th}$ gear can be applied already. From this situation any gear in the second group can be reached while torque is retained.

Figure 53:
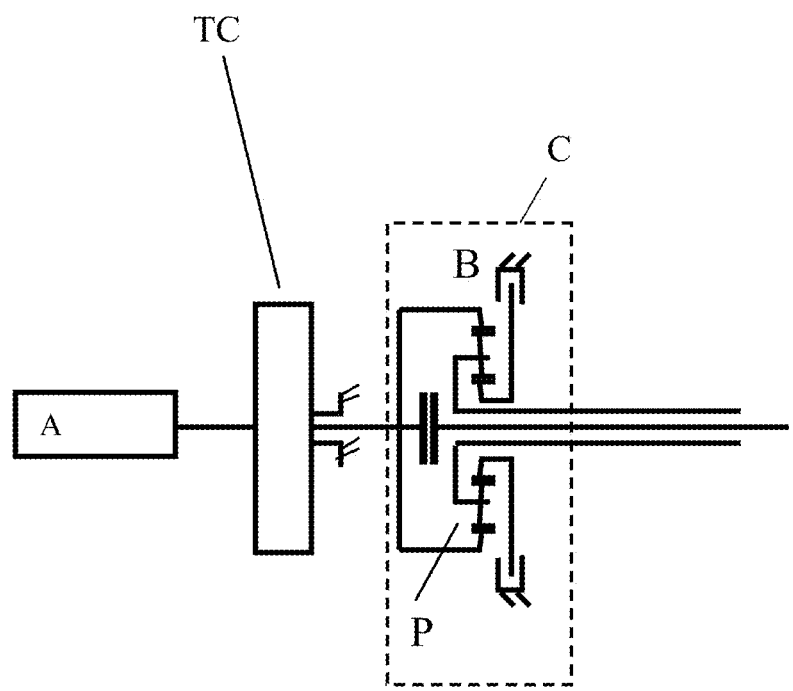

In one of the above transmission systems a torque converter TC may be located between the combustion engine and the input shaft of the clutch module. See FIG. 53.

Furthermore, in one of the above transmission systems a clutch actuation may be constructed concentrically around the oil input/output of the torque converter.

Further, on one of the above transmission systems an electromotor may be located between the combustion engine and the input shaft of the clutch module.

Albeit the invention has been described in the foregoing based on the drawings, it should be observed that the invention is not by any manner or means restricted to the embodiments shown in the drawings. The invention also extends to all embodiments deviating from the embodiments shown in the drawings within the spirit and scope defined by the claims.

What is claimed is:

1. A transmission system for a vehicle, comprising an input shaft which can be connected to a drive source, and an output shaft which can be connected to a load, and comprising:
    a clutch module which has an input that is connected to the input shaft and a first and a second output, as well as first clutch means which are located between the input and the first output and second clutch means which are located between the input and the second output, and gear stage means which are located between the input and the first or second output, as well as
    a transmission module having a first and a second input and an output that is connected to the output shaft, as well as a first sub-transmission which is located between the first input and the output and a second sub-transmission which is located between the second input and the output,
    where the first output of the clutch module is connected to a first input of the transmission module and the second output of the clutch module is connected to the second input of the transmission module, and
    where the first and second sub-transmissions each comprise an input shaft and an output shaft which are connected to the inputs and output of the transmission module and at least one of said first and second sub-transmissions comprises at least one gear stage, which gear stages are located between the input and output shafts;
    wherein the transmission system further comprises an intermediate clutch which is located between the two inputs of the transmission module, wherein the first and second input of the transmission module are coupled directly to each other by at least said intermediate clutch.

2. A transmission system as claimed in claim 1, characterized in that at least one of the sub-transmissions comprises at least one transmission clutch which is located between the input shaft and the output shaft of this sub-transmission.

3. A transmission system as claimed in claim 1 or 2, characterized in that the first clutch means are formed by a first clutch and the gear stage means are located between the input and the first output and are formed by a main gear stage.

4. The transmission system of claim 1, wherein the first and second input of the transmission module are coupled directly to each other by said intermediate clutch and an intermediate gear stage.

5. A transmission system as claimed in claim 1, characterized in that the largest gear ratio of the transmission system is achieved by having the drive transmitted via the first clutch means, the intermediate clutch and the second sub-transmission, in which the second sub-transmission has the larger gear ratio of the two sub-transmissions.

6. A transmission system as claimed in claim 1 or 5, characterized in that the smallest gear ratio of the transmission system is achieved by having the drive transmitted via the second clutch means, the intermediate clutch and the first sub-transmission, in which the first sub-transmission has the smaller gear ratio of the two sub-transmissions.

7. A transmission system as claimed in claim 1 or 5, characterized in that the transmission system comprises an intermediate gear stage which is located between the two inputs of the transmission module and is connected to the intermediate clutch.

\* \* \* \* \*